(12) United States Patent
Li

(10) Patent No.: US 10,212,680 B2
(45) Date of Patent: Feb. 19, 2019

(54) SYNCHRONIZATION SIGNAL SENDING AND RECEIVING METHOD, APPARATUS, AND DEVICE

(71) Applicant: Huawei Technologies Co., Ltd., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 15/343,878

(22) Filed: Nov. 4, 2016

(65) Prior Publication Data

US 2017/0078998 A1 Mar. 16, 2017

Related U.S. Application Data

(63) Continuation of application No. PCT/CN2014/076717, filed on May 4, 2014.

(51) Int. Cl.
  *H04W 56/00* (2009.01)
  *H04L 27/26* (2006.01)
  *H04W 92/18* (2009.01)

(52) U.S. Cl.
  CPC ....... *H04W 56/0015* (2013.01); *H04L 27/261* (2013.01); *H04W 56/00* (2013.01); *H04W 92/18* (2013.01)

(58) Field of Classification Search
  CPC . H04W 56/00; H04W 56/0015; H04W 92/18; H04L 27/261
  See application file for complete search history.

(56) References Cited

U.S. PATENT DOCUMENTS

2007/0230620 A1* 10/2007 Poberezhskiy ..... H04L 27/2071 375/308
2011/0009138 A1* 1/2011 Kim, II ................ H04J 11/0069 455/507
2012/0117135 A1* 5/2012 Yoon ..................... H04J 13/102 708/209

FOREIGN PATENT DOCUMENTS

CN 101043490 A 9/2007
CN 101465830 A 6/2009
(Continued)

OTHER PUBLICATIONS

3GPP TR 36.873 V2.0.0 (Mar. 2014); 3rd Generation Partnership Project; Technical Specification Group Radio Access Network; Study on 3D channel model for LTE; (Release 12); 38 pages.
(Continued)

*Primary Examiner* — Jianye Wu
(74) *Attorney, Agent, or Firm* — Slater Matsil, LLP

(57) ABSTRACT

Embodiments provide synchronization signal sending and receiving methods, apparatuses, and devices. The synchronization signal sending apparatus of the embodiments includes a synchronization signal generation module, configured to generate a synchronization signal according to one or more sequences, where a length or lengths of the one or more sequences are determined according to a length of the synchronization signal. The apparatus also includes a baseband signal obtaining module, configured to obtain a baseband signal according to the synchronization signal generated by the synchronization signal generation module. Additionally, the apparatus includes a first sending module, configured to send, after performing radio frequency conversion, out the baseband signal obtained by the baseband signal obtaining module.

20 Claims, 6 Drawing Sheets

(56) References Cited

FOREIGN PATENT DOCUMENTS

| | | |
|---|---|---|
| CN | 101867389 A | 10/2010 |
| CN | 102484577 A | 5/2012 |
| EP | 2456117 A2 | 5/2012 |
| JP | 2001257624 A | 9/2001 |
| KR | 20110006199 A | 1/2011 |

OTHER PUBLICATIONS

3GPP TS 36.211 V12.1.0 (Mar. 2014); 3rd Generation Partnership Project; Technical Specification Group Radio Access Network; Evolved Universal Terrestrial Radio Access (E-UTRA); Physical channels and modulation; (Release 12); 120 pages.

LG Electronics, "Discussion on D2D Communication Physical Layer Design", 3GPP TSG RAN WG1 Meeting #76bis, R1-141347, Shenzhen, China, Mar. 31-Apr. 4, 2014, 6 pages.

Ericsson, "Update of Uplink Reference—Signal Hopping, Downlink Reference Signals, Scrambling Sequences, DwPTS.UpPTS Lengths for TDD and Control Channel Processing", 3GPP TSG-RAN WG1 Meeting #52, R1-081161, Sorrento, Italy, Feb. 11-15, 2008, 61 pages.

Qualcomm Incorporated, "Multi-hop D2D Synchronization Performance", 3GPP TSG-RAN WG1 #75, R1-135316, 6.2.8.1.1, Nov. 11-15, 2013, San Francisco, USA, 7 pages.

Tomatis, F. et al., "Synchronization and Cell Search", In: "LTE—The UMTS Long Term Evolution", Feb. 2009 (Feb. 17, 2009), John Wiley & Sons, Ltd. Chichester, UK, XP055064038, ISBN: 978-0-47-069716-0 pp. 142-157, DOI: 10.1002/9780470742891.

\* cited by examiner

SYNCHRONIZATION SIGNAL SENDING AND RECEIVING METHOD, APPARATUS, AND DEVICE

CROSS-REFERENCE TO RELATED APPLICATIONS

This application is a continuation of International Application No. PCT/CN2014/076717, filed on May 4, 2014, the disclosure of which is hereby incorporated by reference in its entirety.

TECHNICAL FIELD

Embodiments relate to communications technologies, and in particular, to synchronization signal sending and receiving methods, apparatuses, and devices.

BACKGROUND

Synchronization is a key technology in a communications system, especially in a wireless communications system. Whether a receiver can be efficiently synchronized with a transmitter greatly affects performance of a communications system. Main indicators for weighing synchronization between devices in a communications system are complexity of synchronization implementation and performance of synchronization detection.

A device to device (D2D) communications system and a typical cellular mobile communications system such as the Global System for Mobile Communications (GSM) have a significant difference in terms of synchronization. In the D2D communications system, multiple user equipments (UE) that serve as transmitters may be totally different in timing, and UE that serves as a receiver needs to be synchronized with the different transmitting UEs, to receive signals from the multiple transmitting UEs. Therefore, the communications system imposes a higher requirement on synchronization, and the receiving UE needs to be quickly and effectively synchronized with all transmitting UEs.

In a process of research on standardization of the 3rd Generation Partnership Project (3GPP), a D2D synchronization signal (D2DSS) is introduced to implement synchronization between different D2D transceivers. The D2DSS includes a primary D2D synchronization signal (PD2DSS) and a secondary D2D synchronization signal (SD2DSS), where the PD2DSS implements initial timing and frequency synchronization between a transmitter and a receiver, and the SD2DSS implements fine synchronization. At the present stage, how to generate a synchronization signal with good correlation attracts much attention.

SUMMARY

Embodiments provide synchronization signal sending and receiving methods, apparatuses, and devices. In a D2D application scenario, a synchronization signal with good correlation is generated, so that in the D2D scenario, sending and receiving of distributed synchronization signals can be implemented, and quick synchronization between a transmit end and a receive end of a synchronization signal can be implemented.

According to a first aspect, an embodiment provides a synchronization signal sending apparatus, including a synchronization signal generation module, configured to generate a synchronization signal according to one or more sequences, where a length or lengths of the one or more sequences are determined according to a length of the synchronization signal. The apparatus also includes a baseband signal obtaining module, configured to obtain a baseband signal according to the synchronization signal generated by the synchronization signal generation module. Additionally, the apparatus includes a first sending module, configured to send, after performing radio frequency conversion, out the baseband signal obtained by the baseband signal obtaining module.

With reference to the first aspect, in a first possible implementation manner of the first aspect, the sequence includes a first sequence, and the synchronization signal generation module includes: a synchronization signal generation unit, configured to: determine a length or lengths of one or more first sequences according to the length of the synchronization signal; determine a first preset value or first preset values corresponding to the one or more first sequences, where the first preset value corresponding to each first sequence is independent; and perform cyclic shifting on the one or more first sequences according to the first preset value or the first preset values, to generate the synchronization signal.

With reference to the first possible implementation manner of the first aspect, in a second possible implementation manner of the first aspect, the sequence further includes a second sequence, and the synchronization signal generation module further includes: a scrambling unit, configured to: generate a scrambling sequence according to one or more second sequences, and perform, by using the scrambling sequence, scrambling processing at least one time on the synchronization signal generated by the synchronization signal generation unit; and the baseband signal obtaining module is specifically configured to: obtain the baseband signal according to the synchronization signal undergoing the scrambling processing performed by the scrambling unit.

With reference to the second possible implementation manner of the first aspect, in a third possible implementation manner of the first aspect, the scrambling unit is specifically configured to: determine a length or lengths of the one or more second sequences according to the length of the synchronization signal; determine a second preset value or second preset values corresponding to the one or more second sequences, where all second sequences are corresponding to one second preset value or different second preset values, and second preset values of scrambling sequences corresponding to all synchronization sources in a group are the same; and perform cyclic shifting on each second sequence according to the second preset value, to generate the scrambling sequence.

With reference to the third possible implementation manner of the first aspect, in a fourth possible implementation manner of the first aspect, when there are multiple scrambling sequences, at least one scrambling sequence is corresponding to one second preset value in the group, and the other scrambling sequences are corresponding to different second preset values.

With reference to the third or the fourth possible implementation manner of the first aspect, in a fifth possible implementation manner of the first aspect, either the first preset value or the second preset value is determined according to a group identity.

With reference to the fifth possible implementation manner of the first aspect, in a sixth possible implementation manner of the first aspect, a preset value includes the first preset value and the second preset value, and the synchronization signal generation unit and the scrambling unit are further configured to: determine the preset value according to the following formula:

$$f(N_{GID}) = a*N_{GID} + b, \text{ or}$$

$$f(N_{GID}) = (a*N_{GID} + b) \mod K,$$

where $N_{GID}$ represents the group identity; a and b are predefined constants; $f(N_{GID})$ represents the preset value; K is a constant defined by a system; and mod represents a modulo operation.

With reference to the fifth or the sixth possible implementation manner of the first aspect, in a seventh possible implementation manner of the first aspect, the group identity is a function of a primary device to device synchronization signal (PD2DSS) identity, or is carried in a first control instruction delivered by a network, or is carried in a second control instruction delivered by a transmit device, or is implicitly indicated by a network.

With reference to any one of the first to the seventh possible implementation manners of the first aspect, in an eighth possible implementation manner of the first aspect, for different first sequences, the synchronization signal generation unit is further configured to: determine an identity ID of the synchronization signal according to the first preset values corresponding to all the first sequences; or determine an ID of the synchronization signal according to the PD2DSS identity and the first preset values corresponding to all the first sequences; or determine an ID of the synchronization signal according to any one of the first preset values of all the first sequences; or determine an ID of the synchronization signal according to the PD2DSS identity and any one of the first preset values of all the first sequences.

With reference to the first aspect or any one of the first to the eighth possible implementation manners of the first aspect, in a ninth possible implementation manner of the first aspect, the baseband signal obtaining module includes: a mapping unit, configured to map the synchronization signal to a subcarrier, to obtain a frequency domain signal; and an obtaining unit, configured to obtain a time domain signal according to the frequency domain signal obtained by the mapping unit.

With reference to the ninth possible implementation manner of the first aspect, in a tenth possible implementation manner of the first aspect, the synchronization signal includes at least one first synchronization signal and at least one second synchronization signal, and first sequences corresponding to all first synchronization signals and all second synchronization signals are the same or different; and the mapping unit is specifically configured to: respectively map all the first synchronization signals to first locations corresponding to all the first synchronization signals, and respectively map all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

With reference to the tenth possible implementation manner of the first aspect, in an eleventh possible implementation manner of the first aspect, the synchronization signal further includes at least one third synchronization signal, and a sequence corresponding to the third synchronization signal is the same as or different from a sequence corresponding to the first synchronization signal or the second synchronization signal; and the mapping unit is further configured to: respectively map all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

With reference to the first aspect or any one of the first to the eleventh possible implementation manners of the first aspect, in a twelfth possible implementation manner of the first aspect, the sequence is generated according to an m-sequence, a Zadoff-Chu (ZC) sequence, or a combination thereof.

With reference to the first aspect or any one of the first to the twelfth possible implementation manners of the first aspect, in a thirteenth possible implementation manner of the first aspect, if the sequence is an m-sequence with a length of 31, a primitive polynomial of the one or more sequences is any one or any combination of the following polynomials:

$$x(\bar{i}+5) = (x(\bar{i}+2) + x(\bar{i})) \mod 2$$

$$x(\bar{i}+5) = (x(\bar{i}+3) + x(\bar{i})) \mod 2$$

$$x(\bar{i}+5) = (x(\bar{i}+3) + x(\bar{i}+2) + x(\bar{i}+1) + x(\bar{i})) \mod 2$$

$$x(\bar{i}+5) = (x(\bar{i}+4) + x(\bar{i}+2) + x(\bar{i}+1) + x(\bar{i})) \mod 2$$

$$x(\bar{i}+5) = (x(\bar{i}+4) + x(\bar{i}+3) + x(\bar{i}+1) + x(\bar{i})) \mod 2$$

$$x(\bar{i}+5) = (x(\bar{i}+4) + x(\bar{i}+3) + x(\bar{i}+2) + x(\bar{i})) \mod 2,$$

where $\bar{i}$ is an integer, a value range of $\bar{i}$ is $0 \leq \bar{i} \leq 25$, and mod 2 represents a modulo operation of division by 2.

With reference to the first aspect or any one of the first to the twelfth possible implementation manners of the first aspect, in a fourteenth possible implementation manner of the first aspect, if the sequence is an m-sequence with a length of 63, a primitive polynomial of the one or more sequences is any one or any combination of the following polynomials:

$$x(\bar{i}+6) = (x(\bar{i}+1) + x(\bar{i})) \mod 2$$

$$x(\bar{i}+6) = (x(\bar{i}+4) + x(\bar{i}+3) + x(\bar{i}+1) + x(\bar{i})) \mod 2$$

$$x(\bar{i}+6) = (x(\bar{i}+5) + x(\bar{i})) \mod 2$$

$$x(\bar{i}+6) = (x(\bar{i}+5) + x(\bar{i}+2) + x(\bar{i}+1) + x(\bar{i})) \mod 2$$

$$x(\bar{i}+6) = (x(\bar{i}+5) + x(\bar{i}+3) + x(\bar{i}+2) + x(\bar{i})) \mod 2$$

$$x(\bar{i}+6) = (x(\bar{i}+5) + x(\bar{i}+4) + x(\bar{i}+1) + x(\bar{i})) \mod 2,$$

where $\bar{i}$ is an integer, a value range of $\bar{i}$ is $0 \leq \bar{i} \leq 56$, and mod 2 represents a modulo operation of division by 2.

With reference to any one of the tenth to the fourteenth possible implementation manners of the first aspect, in a fifteenth possible implementation manner of the first aspect, the obtaining unit is specifically configured to: obtain the baseband signal from the frequency domain signal by means of orthogonal frequency division multiplexing (OFDM); or obtain the baseband signal from the frequency domain signal by means of single carrier frequency division multiple access (SC-FDMA).

With reference to the fifteenth possible implementation manner of the first aspect, in a sixteenth possible implementation manner of the first aspect, the obtaining unit is further configured to: obtain the baseband signal according to the following formula:

$$s(t) = \sum_{k=-\lfloor N/2 \rfloor}^{-1} a_{k^{(-)}} \cdot e^{j2\pi k \Delta f^* t} + \sum_{k=1}^{\lceil N/2 \rceil} a_{k^{(+)}} \cdot e^{j2\pi k \Delta f^* t},$$

where t represents a time independent variable of the baseband signal s(t);

$$k^{(-)}=k+\lfloor N/2 \rfloor, k^{(+)}=k+\lfloor N/2 \rfloor-1;$$

$\Delta f$ is a subcarrier spacing; $a_k$ is a value obtained after frequency domain data is mapped to a corresponding subcarrier;

$$N=N_{RB}^{DL}N_{sc}^{RB},$$

where $N_{RB}^{DL}$ represents a quantity of resource blocks RBs configured for system bandwidth, and $N_{sc}^{RB}$ represents a size of the resource block in a frequency domain; $\lfloor\ \rfloor$ represents a round down operation; and N is a quantity of subcarriers configured for the system bandwidth.

With reference to the fifteenth possible implementation manner of the first aspect, in a seventeenth possible implementation manner of the first aspect, the obtaining unit is further configured to: obtain the baseband signal according to the following formula:

$$s(t) = \sum_{k=-\lfloor N/2 \rfloor}^{\lceil N/2 \rceil-1} a_{k^{(-)}} \cdot e^{j2\pi(k+1/2)\Delta f^* t},$$

where t represents a time independent variable of the baseband signal s(t);

$$k^{(-)}=k+\lfloor N/2 \rfloor;$$

$\Delta f$ is a subcarrier spacing; $a_k$ is a value obtained after frequency domain data is mapped to a corresponding subcarrier; $N=N_{RB}^{UL}N_{sc}^{RB}$, where $N_{RB}^{UL}$ represents a quantity of resource blocks RBs configured for system bandwidth, and $N_{sc}^{RB}$ represents a size of the resource block in a frequency domain; $\lfloor\ \rfloor$ represents a round down operation; and N is a quantity of subcarriers configured for the system bandwidth.

With reference to the seventeenth possible implementation manner of the first aspect, in an eighteenth possible implementation manner of the first aspect, the apparatus further includes: a conversion module, configured to perform discrete Fourier transform (DFT) on the synchronization signal, to obtain a converted signal; and the obtaining unit is configured to map the converted signal to a subcarrier by means of SC-FDMA, to obtain the baseband signal.

With reference to the eighteenth possible implementation manner of the first aspect, in a nineteenth possible implementation manner of the first aspect, the conversion module is specifically configured to: obtain the converted signal according to the following formula:

$$b(n) = \frac{1}{\sqrt{L}} \sum_{l=0}^{L-1} d(l) e^{-\frac{2\pi j}{L} l^* n},$$

where l represents an independent variable of the synchronization signal d(l); L is the length of the synchronization signal; b(n) represents the converted signal obtained after DFT is performed on the synchronization signal, where $0 \leq n \leq L-1$; and j represents an imaginary unit.

With reference to the first aspect or any one of the first to the nineteenth possible implementation manners of the first aspect, in a twentieth possible implementation manner of the first aspect, the first sending module is specifically configured to: obtain a radio frequency signal after performing radio frequency conversion on the baseband signal; and send out the radio frequency signal when a preset period arrives.

According to a second aspect, an embodiment provides a synchronization signal receiving apparatus, including a receiving module, configured to receive a synchronization signal, where the synchronization signal is generated by a transmit end according to one or more sequences, and a length or lengths of the one or more sequences are determined according to a length of the synchronization signal. The receiving module also includes a processing module, configured to detect the synchronization signal received by the receiving module, to obtain synchronization with the transmit end of the synchronization signal.

With reference to the second aspect, in a first possible implementation manner of the second aspect, the sequence is generated according to an m-sequence, a ZC sequence, or a combination thereof.

With reference to the second aspect or the first possible implementation manner of the second aspect, in a second possible implementation manner of the second aspect, if the sequence is an m-sequence with a length of 31, a primitive polynomial for generating the one or more sequences is any one or any combination of the following polynomials:

$x(\bar{i}+5)=(x(\bar{i}+2)+x(\bar{i}))\bmod 2$ $x(\bar{i}+5)=(x(\bar{i}+3)+x(\bar{i}))\bmod 2$ $x(\bar{i}+5)=(x(\bar{i}+3)+x(\bar{i}+2)+x(\bar{i}+1)+x(\bar{i}))\bmod 2$ $x(\bar{i}+5)=(x(\bar{i}+4)+x(\bar{i}+2)+x(\bar{i}+1)+x(\bar{i}))\bmod 2$ $x(\bar{i}+5)=(x(\bar{i}+4)+x(\bar{i}+3)+x(\bar{i}+1)+x(\bar{i}))\bmod 2$ $x(\bar{i}+5)=(x(\bar{i}+4)+x(\bar{i}+3)+x(\bar{i}+2)+x(\bar{i}))\bmod 2,$ where $\bar{i}$ is an integer, a value range of $\bar{i}$ is $0 \leq \bar{i} \leq 25$, and mod 2 represents a modulo operation of division by 2.

With reference to the second aspect or the first possible implementation manner of the second aspect, in a third possible implementation manner of the second aspect, if the sequence is an m-sequence with a length of 63, a primitive polynomial for generating the one or more sequences is any one or any combination of the following polynomials:

$x(\bar{i}+6)=(x(\bar{i}+1)+x(\bar{i}))\bmod 2$ $x(\bar{i}+6)=(x(\bar{i}+4)+x(\bar{i}+3)+x(\bar{i}+1)+x(\bar{i}))\bmod 2$ $x(\bar{i}+6)=(x(\bar{i}+5)+x(\bar{i}))\bmod 2$ $x(\bar{i}+6)=(x(\bar{i}+5)+x(\bar{i}+2)+x(\bar{i}+1)+x(\bar{i}))\bmod 2$ $$x(\bar{i}+6)=(x(\bar{i}+5)+x(\bar{i}+3)+x(\bar{i}+2)+x(\bar{i}))\bmod 2$$

$$x(\bar{i}+6)=(x(\bar{i}+5)+x(\bar{i}+4)+x(\bar{i}+1)+x(\bar{i}))\bmod 2,$$

where $\bar{i}$ is an integer, a value range of $\bar{i}$ is $0\leq\bar{i}\leq 56$, and mod 2 represents a modulo operation of division by 2.

With reference to the second aspect or any one of the first to the third possible implementation manners of the second aspect, in a fourth possible implementation manner of the second aspect, the apparatus further includes a second sending module, and the processing module is further configured to: detect, according to a preset criterion, whether the receiving module receives the synchronization signal; and if the synchronization signal is not detected, trigger the second sending module to send a synchronization signal generated by the apparatus to another receive end.

According to a third aspect, an embodiment provides a synchronization signal sending device, including: a first processor, configured to: generate a synchronization signal according to one or more sequences, where a length or lengths of the one or more sequences are determined according to a length of the synchronization signal; and obtain a baseband signal according to the synchronization signal; and a first transmitter, configured to send, after performing radio frequency conversion, out the baseband signal obtained by the first processor.

With reference to the third aspect, in a first possible implementation manner of the third aspect, the sequence includes a first sequence, and the first processor is specifically configured to: determine a length or lengths of one or more first sequences according to the length of the synchronization signal; determine a first preset value or first preset values corresponding to the one or more first sequences, where the first preset value corresponding to each first sequence is independent; and perform cyclic shifting on the one or more first sequences according to the first preset value or the first preset values, to generate the synchronization signal.

With reference to the first possible implementation manner of the third aspect, in a second possible implementation manner of the third aspect, the sequence further includes a second sequence, and the first processor is further configured to: generate a scrambling sequence according to one or more second sequences; and perform scrambling processing at least one time on the synchronization signal by using the scrambling sequence; and the obtaining a baseband signal according to the synchronization signal is specifically: obtaining the baseband signal according to the synchronization signal undergoing the scrambling processing.

With reference to the second possible implementation manner of the third aspect, in a third possible implementation manner of the third aspect, the first processor is further configured to: determine a length or lengths of the one or more second sequences according to the length of the synchronization signal; determine a second preset value or second preset values corresponding to the one or more second sequences, where all second sequences are corresponding to one second preset value or different second preset values, and second preset values of scrambling sequences corresponding to all synchronization sources in a group are the same; and perform cyclic shifting on each second sequence according to the second preset value, to generate the scrambling sequence.

With reference to the third possible implementation manner of the third aspect, in a fourth possible implementation manner of the third aspect, when there are multiple scrambling sequences, at least one scrambling sequence is corresponding to one second preset value in the group, and the other scrambling sequences are corresponding to different second preset values.

With reference to the third or the fourth possible implementation manner of the third aspect, in a fifth possible implementation manner of the third aspect, either the first preset value or the second preset value is determined according to a group identity.

With reference to the fifth possible implementation manner of the third aspect, in a sixth possible implementation manner of the third aspect, a preset value includes the first preset value and the second preset value, and the first processor is further configured to: determine the preset value according to the following formula:

$$f(N_{GID})=a*N_{GID}+b, \text{ or}$$

$$f(N_{GID})=(a*N_{GID}+b)\bmod K,$$

where $N_{GID}$ represents the group identity; a and b are predefined constants; $f(N_{GID})$ represents the preset value; K is a constant defined by a system; and mod represents a modulo operation.

With reference to the fifth or the sixth possible implementation manner of the third aspect, in a seventh possible implementation manner of the third aspect, the group identity is a function of a PD2DSS identity, or is carried in a first control instruction delivered by a network, or is carried in a second control instruction delivered by a transmit device, or is implicitly indicated by a network.

With reference to any one of the first to the seventh possible implementation manners of the third aspect, in an eighth possible implementation manner of the third aspect, for different first sequences, the first processor is further configured to: determine an ID of the synchronization signal according to the first preset values corresponding to all the first sequences; or determine an ID of the synchronization signal according to the PD2DSS identity and the first preset values corresponding to all the first sequences; or determine an ID of the synchronization signal according to any one of the first preset values of all the first sequences; or determine an ID of the synchronization signal according to the PD2DSS identity and any one of the first preset values of all the first sequences.

With reference to the third aspect or any one of the first to the eighth possible implementation manners of the third aspect, in a ninth possible implementation manner of the third aspect, that the first processor is configured to obtain a baseband signal according to the synchronization signal is specifically: the first processor is configured to: map the synchronization signal to a subcarrier, to obtain a frequency domain signal; and obtain a time domain signal according to the frequency domain signal.

With reference to the ninth possible implementation manner of the third aspect, in a tenth possible implementation manner of the third aspect, the synchronization signal includes at least one first synchronization signal and at least one second synchronization signal, and first sequences corresponding to all first synchronization signals and all second synchronization signals are the same or different; and that the first processor is configured to map the synchronization signal to a subcarrier, to obtain a frequency domain signal is specifically: the first processor is configured to respectively map all the first synchronization signals to first locations corresponding to all the first synchronization signals, and respectively map all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

With reference to the tenth possible implementation manner of the third aspect, in an eleventh possible implementation manner of the third aspect, the synchronization signal further includes at least one third synchronization signal, and a sequence corresponding to the third synchronization signal is the same as or different from a sequence corresponding to the first synchronization signal or the second synchronization signal; and that the first processor is configured to map the synchronization signal to a subcarrier, to obtain a frequency domain signal is specifically: the first processor is configured to respectively map all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

With reference to the third aspect or any one of the first to the eleventh possible implementation manners of the third aspect, in a twelfth possible implementation manner of the third aspect, the sequence is generated according to an m-sequence, a ZC sequence, or a combination thereof.

With reference to the third aspect or any one of the first to the twelfth possible implementation manners of the third aspect, in a thirteenth possible implementation manner of the third aspect, if the sequence is an m-sequence with a length of 31, a primitive polynomial of the one or more sequences is any one or any combination of the following polynomials:

$x(\bar{i}+5)=(x(\bar{i}+2)+x(\bar{i}))\bmod 2$ $x(\bar{i}+5)=(x(\bar{i}+3)+x(\bar{i}))\bmod 2$ $x(\bar{i}+5)=(x(\bar{i}+3)+x(\bar{i}+2)+x(\bar{i}+1)+x(\bar{i}))\bmod 2$ $x(\bar{i}+5)=(x(\bar{i}+4)+x(\bar{i}+2)+x(\bar{i}+1)+x(\bar{i}))\bmod 2$ $x(\bar{i}+5)=(x(\bar{i}+4)+x(\bar{i}+3)+x(\bar{i}+1)+x(\bar{i}))\bmod 2$ $x(\bar{i}+5)=(x(\bar{i}+4)+x(\bar{i}+3)+x(\bar{i}+2)+x(\bar{i}))\bmod 2$ where $\bar{i}$ is an integer, a value range of $\bar{i}$ is $0\leq\bar{i}\leq 25$, and mod 2 represents a modulo operation of division by 2.

With reference to the third aspect or any one of the first to the twelfth possible implementation manners of the third aspect, in a fourteenth possible implementation manner of the third aspect, if the sequence is an m-sequence with a length of 63, a primitive polynomial of the one or more sequences is any one or any combination of the following polynomials:

$x(\bar{i}+6)=(x(\bar{i}+1)+x(\bar{i}))\bmod 2$ $x(\bar{i}+6)=(x(\bar{i}+4)+x(\bar{i}+3)+x(\bar{i}+1)+x(\bar{i}))\bmod 2$ $x(\bar{i}+6)=(x(\bar{i}+5)+x(\bar{i}))\bmod 2$ $x(\bar{i}+6)=(x(\bar{i}+5)+x(\bar{i}+2)+x(\bar{i}+1)+x(\bar{i}))\bmod 2$ $x(\bar{i}+6)=(x(\bar{i}+5)+x(\bar{i}+3)+x(\bar{i}+2)+x(\bar{i}))\bmod 2$ $x(\bar{i}+6)=(x(\bar{i}+5)+x(\bar{i}+4)+x(\bar{i}+1)+x(\bar{i}))\bmod 2$ where $\bar{i}$ is an integer, a value range of $\bar{i}$ is $0\leq\bar{i}\leq 56$, and mod 2 represents a modulo operation of division by 2.

With reference to any one of the tenth to the fourteenth possible implementation manners of the third aspect, in a fifteenth possible implementation manner of the third aspect, that the first processor is configured to obtain a time domain signal according to the frequency domain signal is specifically: the first processor is configured to obtain the baseband signal from the frequency domain signal by means of OFDM; or the first processor is configured to obtain the baseband signal from the frequency domain signal by means of SC-FDMA.

With reference to the fifteenth possible implementation manner of the third aspect, in a sixteenth possible implementation manner of the third aspect, that the first processor is configured to obtain the baseband signal from the frequency domain signal by means of OFDM is specifically: the first processor is configured to obtain the baseband signal according to the following formula:

$$s(t) = \sum_{k=-\lfloor N/2 \rfloor}^{-1} a_{k^{(-)}} \cdot e^{j2\pi k \Delta f^* t} + \sum_{k=1}^{\lceil N/2 \rceil} a_{k^{(+)}} \cdot e^{j2\pi k \Delta f^* t},$$

where t represents a time independent variable of the baseband signal s(t);

$k^{(-)}=k+\lfloor N/2 \rfloor, k^{(+)}=k+\lfloor N/2 \rfloor-1;$ $\Delta f$ is a subcarrier spacing; $a_k$ is a value obtained after frequency domain data is mapped to a corresponding subcarrier; $N=N_{RB}^{DL}N_{sc}^{RB}$, where $N_{RB}^{DL}$ represents a quantity of resource blocks RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

With reference to the fifteenth possible implementation manner of the third aspect, in a seventeenth possible implementation manner of the third aspect, that the first processor is configured to obtain the baseband signal from the frequency domain signal by means of SC-FDMA is specifically: the first processor is configured to obtain the baseband signal according to the following formula:

$$s(t) = \sum_{k=-\lfloor N/2 \rfloor}^{\lceil N/2 \rceil-1} a_{k^{(-)}} \cdot e^{j2\pi(k+1/2)\Delta f^* t},$$

where t represents a time independent variable of the baseband signal s(t);

$k^{(-)}=k+\lfloor N/2 \rfloor;$ $\Delta f$ is a subcarrier spacing; $a_k$ is a value obtained after frequency domain data is mapped to a corresponding subcarrier; $N=N_{RB}^{UL}N_{sc}^{RB}$, where $N_{RB}^{UL}$ represents a quantity of resource blocks RBs configured for system bandwidth, and $N_{sc}^{RB}$ represents a size of the resource block in a frequency domain; ⌊ ⌋ represents a round down operation; and N is a quantity of subcarriers configured for the system bandwidth.

With reference to the seventeenth possible implementation manner of the third aspect, in an eighteenth possible implementation manner of the third aspect, the first processor is further configured to: perform DFT on the synchronization signal, to obtain a converted signal; and that the first processor is configured to map the synchronization signal to a subcarrier by means of SC-FDMA, to obtain the baseband signal is specifically: the first processor is configured to map the converted signal to the subcarrier by means of SC-FDMA, to obtain the baseband signal.

With reference to the eighteenth possible implementation manner of the third aspect, in a nineteenth possible implementation manner of the third aspect, that the first processor is configured to perform DFT on the synchronization signal, to obtain a converted signal is specifically: the first processor is configured to obtain the converted signal according to the following formula:

$$b(n) = \frac{1}{\sqrt{L}} \sum_{l=0}^{L-1} d(l) e^{-\frac{2\pi j}{L} l^* n},$$

where l represents an independent variable of the synchronization signal d(l); L is the length of the synchronization signal; b(n) represents the converted signal obtained after DFT is performed on the synchronization signal, where 0≤n≤L−1; and j represents an imaginary unit.

With reference to the third aspect or any one of the first to the nineteenth possible implementation manners of the third aspect, in a twentieth possible implementation manner of the third aspect, the first transmitter is specifically configured to: obtain a radio frequency signal after performing radio frequency conversion on the baseband signal; and send out the radio frequency signal when a preset period arrives.

According to a fourth aspect, an embodiment provides a synchronization signal receiving device, including: a receiver, configured to receive a synchronization signal, where the synchronization signal is generated by a transmit end according to one or more sequences, and a length or lengths of the one or more sequences are determined according to a length of the synchronization signal; and a second processor, configured to detect the synchronization signal received by the receiver, to obtain synchronization between the transmit end and a receive end of the synchronization signal.

With reference to the fourth aspect, in a first possible implementation manner of the fourth aspect, the sequence is generated according to an m-sequence, a ZC sequence, or a combination thereof.

With reference to the fourth aspect or the first possible implementation manner of the fourth aspect, in a second possible implementation manner of the fourth aspect, if the sequence is an m-sequence with a length of 31, a primitive polynomial for generating the one or more sequences is any one or any combination of the following polynomials:

$x(\bar{i}+5)=(x(\bar{i}+2)+x(\bar{i}))\mod 2$ $x(\bar{i}+5)=(x(\bar{i}+3)+x(\bar{i}))\mod 2$ $x(\bar{i}+5)=(x(\bar{i}+3)+x(\bar{i}+2)+x(\bar{i}+1)+x(\bar{i}))\mod 2$ $x(\bar{i}+5)=(x(\bar{i}+4)+x(\bar{i}+2)+x(\bar{i}+1)+x(\bar{i}))\mod 2$ $x(\bar{i}+5)=(x(\bar{i}+4)+x(\bar{i}+3)+x(\bar{i}+1)+x(\bar{i}))\mod 2$ $x(\bar{i}+5)=(x(\bar{i}+4)+x(\bar{i}+3)+x(\bar{i}+2)+x(\bar{i}))\mod 2,$ where $\bar{i}$ is an integer, a value range of $\bar{i}$ is 0≤$\bar{i}$≤25, and mod 2 represents a modulo operation of division by 2.

With reference to the fourth aspect or the first possible implementation manner of the fourth aspect, in a third possible implementation manner of the fourth aspect, if the sequence is an m-sequence with a length of 63, a primitive polynomial for generating the one or more sequences is any one or any combination of the following polynomials:

$x(\bar{i}+6)=(x(\bar{i}+1)+x(\bar{i}))\mod 2$ $x(\bar{i}+6)=(x(\bar{i}+4)+x(\bar{i}+3)+x(\bar{i}+1)+x(\bar{i}))\mod 2$ $x(\bar{i}+6)=(x(\bar{i}+5)+x(\bar{i}))\mod 2$ $x(\bar{i}+6)=(x(\bar{i}+5)+x(\bar{i}+2)+x(\bar{i}+1)+x(\bar{i}))\mod 2$ $x(\bar{i}+6)=(x(\bar{i}+5)+x(\bar{i}+3)+x(\bar{i}+2)+x(\bar{i}))\mod 2$ $x(\bar{i}+6)=(x(\bar{i}+5)+x(\bar{i}+4)+x(\bar{i}+1)+x(\bar{i}))\mod 2,$ where $\bar{i}$ is an integer, a value range of $\bar{i}$ is 0≤$\bar{i}$≤56, and mod 2 represents a modulo operation of division by 2.

With reference to the fourth aspect or any one of the first to the third possible implementation manners of the fourth aspect, in a fourth possible implementation manner of the fourth aspect, the receiving device further includes a second transmitter, and the second processor is further configured to: detect, according to a preset criterion, whether the receiver receives the synchronization signal; and if the synchronization signal is not detected, trigger the second transmitter to send a synchronization signal generated by the receiving device to another receive end.

According to a fifth aspect, an embodiment provides a synchronization signal sending method, including: generating a synchronization signal according to one or more sequences, where a length or lengths of the one or more sequences are determined according to a length of the synchronization signal; obtaining a baseband signal according to the synchronization signal; and sending out the baseband signal after performing radio frequency conversion.

With reference to the fifth aspect, in a first possible implementation manner of the fifth aspect, the sequence includes a first sequence, the generating a synchronization signal according to one or more sequences includes: determining a length or lengths of one or more first sequences according to the length of the synchronization signal; determining a first preset value or first preset values corresponding to the one or more first sequences, where the first preset value corresponding to each first sequence is independent; and performing cyclic shifting on the one or more first sequences according to the first preset value or the first preset values, to generate the synchronization signal.

With reference to the first possible implementation manner of the fifth aspect, in a second possible implementation manner of the fifth aspect, the sequence further includes a second sequence, and the generating a synchronization signal according to one or more sequences further includes: generating a scrambling sequence according to one or more second sequences; and performing scrambling processing at least one time on the synchronization signal by using the scrambling sequence; and the obtaining a baseband signal according to the synchronization signal is specifically: obtaining the baseband signal according to the synchronization signal undergoing the scrambling processing.

With reference to the second possible implementation manner of the fifth aspect, in a third possible implementation manner of the fifth aspect, the generating a scrambling sequence according to one or more second sequences includes: determining a length or lengths of the one or more second sequences according to the length of the synchronization signal; determining a second preset value or second preset values corresponding to the one or more second sequences, where all second sequences are corresponding to one second preset value or different second preset values, and second preset values of scrambling sequences corresponding to all synchronization sources in a group are the same; and performing cyclic shifting on each second sequence according to the second preset value, to generate the scrambling sequence.

With reference to the third possible implementation manner of the fifth aspect, in a fourth possible implementation manner of the fifth aspect, when there are multiple scrambling sequences, at least one scrambling sequence is corresponding to one second preset value in the group, and the other scrambling sequences are corresponding to different second preset values.

With reference to the third or the fourth possible implementation manner of the fifth aspect, in a fifth possible implementation manner of the fifth aspect, either the first preset value or the second preset value is determined according to a group identity.

With reference to the fifth possible implementation manner of the fifth aspect, in a sixth possible implementation manner of the fifth aspect, a preset value includes the first preset value and the second preset value, and determining the preset value according to the group identity is specifically: determining the preset value according to the following formula:

$$f(N_{GID})=a*N_{GID}+b, \text{ or}$$

$$f(N_{GID})=(a*N_{GID}+b) \bmod K,$$

where $N_{GID}$ represents the group identity; a and b are predefined constants; $f(N_{GID})$ represents the preset value; K is a constant defined by a system; and mod represents a modulo operation.

With reference to the fifth or the sixth possible implementation manner of the fifth aspect, in a seventh possible implementation manner of the fifth aspect, the group identity is a function of a PD2DSS identity, or is carried in a first control instruction delivered by a network, or is carried in a second control instruction delivered by a transmit device, or is implicitly indicated by a network.

With reference to any one of the first to the seventh possible implementation manners of the fifth aspect, in an eighth possible implementation manner of the fifth aspect, for different first sequences, a relationship between first preset values respectively corresponding to the first sequences and an identity ID of the synchronization signal is: determining the ID of the synchronization signal according to the first preset values corresponding to all the first sequences; or determining the ID of the synchronization signal according to the PD2DSS identity and the first preset values corresponding to all the first sequences; or determining the ID of the synchronization signal according to any one of the first preset values of all the first sequences; or determining the ID of the synchronization signal according to the PD2DSS identity and any one of the first preset values of all the first sequences.

With reference to the fifth aspect or any one of the first to the eighth possible implementation manners of the fifth aspect, in a ninth possible implementation manner of the fifth aspect, the obtaining a baseband signal according to the synchronization signal includes: mapping the synchronization signal to a subcarrier, to obtain a frequency domain signal; and obtaining a time domain signal according to the frequency domain signal.

With reference to the ninth possible implementation manner of the fifth aspect, in a tenth possible implementation manner of the fifth aspect, the synchronization signal includes at least one first synchronization signal and at least one second synchronization signal, and first sequences corresponding to all first synchronization signals and all second synchronization signals are the same or different; and the mapping the synchronization signal to a subcarrier, to obtain a frequency domain signal includes: respectively mapping all the first synchronization signals to first locations corresponding to all the first synchronization signals, and respectively mapping all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

With reference to the tenth possible implementation manner of the fifth aspect, in an eleventh possible implementation manner of the fifth aspect, the synchronization signal further includes at least one third synchronization signal, and a sequence corresponding to the third synchronization signal is the same as or different from a sequence corresponding to the first synchronization signal or the second synchronization signal; and the mapping the synchronization signal to a subcarrier, to obtain a frequency domain signal further includes: respectively mapping all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

With reference to the fifth aspect or any one of the first to the eleventh possible implementation manners of the fifth aspect, in a twelfth possible implementation manner of the fifth aspect, the sequence is generated according to an m-sequence, a ZC sequence, or a combination thereof.

With reference to the fifth aspect or any one of the first to the twelfth possible implementation manners of the fifth aspect, in a thirteenth possible implementation manner of the fifth aspect, if the sequence is an m-sequence with a length of 31, a primitive polynomial of the one or more sequences is any one or any combination of the following polynomials:

$$x(\bar{i}+5)=(x(\bar{i}+2)+x(\bar{i})) \bmod 2$$

$$x(\bar{i}+5)=(x(\bar{i}+3)+x(\bar{i})) \bmod 2$$

$$x(\bar{i}+5)=(x(\bar{i}+3)+x(\bar{i}+2)+x(\bar{i}+1)+x(\bar{i})) \bmod 2$$

$$x(\bar{i}+5)=(x(\bar{i}+4)+x(\bar{i}+2)+x(\bar{i}+1)+x(\bar{i}))\bmod 2$$

$$x(\bar{i}+5)=(x(\bar{i}+4)+x(\bar{i}+3)+x(\bar{i}+1)+x(\bar{i}))\bmod 2$$

$$x(\bar{i}+5)=(x(\bar{i}+4)+x(\bar{i}+3)+x(\bar{i}+2)+x(\bar{i}))\bmod 2$$

where $\bar{i}$ is an integer, a value range of $\bar{i}$ is $0 \leq \bar{i} \leq 25$, and mod 2 represents a modulo operation of division by 2.

With reference to the fifth aspect or any one of the first to the twelfth possible implementation manners of the fifth aspect, in a fourteenth possible implementation manner of the fifth aspect, if the sequence is an m-sequence with a length of 63, a primitive polynomial of the one or more sequences is any one or any combination of the following polynomials:

$$x(\bar{i}+6)=(x(\bar{i}+1)+x(\bar{i}))\bmod 2$$

$$x(\bar{i}+6)=(x(\bar{i}+4)+x(\bar{i}+3)+x(\bar{i}+1)+x(\bar{i}))\bmod 2$$

$$x(\bar{i}+6)=(x(\bar{i}+5)+x(\bar{i}))\bmod 2$$

$$x(\bar{i}+6)=(x(\bar{i}+5)+x(\bar{i}+2)+x(\bar{i}+1)+x(\bar{i}))\bmod 2$$

$$x(\bar{i}+6)=(x(\bar{i}+5)+x(\bar{i}+3)+x(\bar{i}+2)+x(\bar{i}))\bmod 2$$

$$x(\bar{i}+6)=(x(\bar{i}+5)+x(\bar{i}+4)+x(\bar{i}+1)+x(\bar{i}))\bmod 2$$

where $\bar{i}$ is an integer, a value range of $\bar{i}$ is $0 \leq \bar{i} \leq 56$, and mod 2 represents a modulo operation of division by 2.

With reference to any one of the tenth to the fourteenth possible implementation manners of the fifth aspect, in a fifteenth possible implementation manner of the fifth aspect, the obtaining a time domain signal according to the frequency domain signal includes: obtaining the baseband signal from the frequency domain signal by means of OFDM; or obtaining the baseband signal from the frequency domain signal by means SC-FDMA.

With reference to the fifteenth possible implementation manner of the fifth aspect, in a sixteenth possible implementation manner of the fifth aspect, the obtaining the baseband signal from the frequency domain signal by means of OFDM includes: obtaining the baseband signal according to the following formula:

$$s(t) = \sum_{k=-\lfloor N/2 \rfloor}^{-1} a_{k(-)} \cdot e^{j2\pi k \Delta f^* t} + \sum_{k=1}^{\lceil N/2 \rceil} a_{k(+)} \cdot e^{j2\pi k \Delta f^* t},$$

where t represents a time independent variable of the baseband signal s(t);

$$k^{(-)}=k+\lfloor N/2 \rfloor, k^{(+)}=k+\lfloor N/2 \rfloor -1;$$

$\Delta f$ is a subcarrier spacing; $a_k$ is a value obtained after frequency domain data is mapped to a corresponding subcarrier;

$$N=N_{RB}^{DL} N_{sc}^{RB},$$

where $N_{RB}^{DL}$ represents a quantity of resource blocks RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

With reference to the fifteenth possible implementation manner of the fifth aspect, in a seventeenth possible implementation manner of the fifth aspect, the obtaining the baseband signal from the frequency domain signal by means of SC-FDMA includes: obtaining the baseband signal according to the following formula:

$$s(t) = \sum_{k=-\lfloor N/2 \rfloor}^{\lceil N/2 \rceil -1} a_{k(-)} \cdot e^{j2\pi(k+1/2)\Delta f^* t},$$

where t represents a time independent variable of the baseband signal s(t);

$$k^{(-)}=k+\lfloor N/2 \rfloor;$$

$\Delta f$ is a subcarrier spacing; $a_k$ is a value obtained after frequency domain data is mapped to a corresponding subcarrier;

$$N=N_{RB}^{UL} N_{sc}^{RB},$$

where $N_{RB}^{UL}$ represents a quantity of resource blocks RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

With reference to the seventeenth possible implementation manner of the fifth aspect, in an eighteenth possible implementation manner of the fifth aspect, before the mapping the synchronization signal to a subcarrier by means of SC-FDMA, to obtain the baseband signal, the method further includes: performing DFT on the synchronization signal, to obtain a converted signal; and the mapping the synchronization signal to a subcarrier by means of SC-FDMA, to obtain the baseband signal is specifically: mapping the converted signal to the subcarrier by means of SC-FDMA, to obtain the baseband signal.

With reference to the eighteenth possible implementation manner of the fifth aspect, in a nineteenth possible implementation manner of the fifth aspect, the performing DFT on the synchronization signal, to obtain a converted signal includes: obtaining the converted signal according to the following formula:

$$b(n) = \frac{1}{\sqrt{L}} \sum_{l=0}^{L-1} d(l) e^{-\frac{2\pi j}{L} l^* n},$$

where l represents an independent variable of the synchronization signal d(l); L is the length of the synchronization signal; b(n) represents the converted signal obtained after DFT is performed on the synchronization signal, where $0 \leq n \leq L-1$; and j represents an imaginary unit.

With reference to the fifth aspect or any one of the first to the nineteenth possible implementation manners of the fifth aspect, in a twentieth possible implementation manner of the fifth aspect, the sending out the baseband signal after performing radio frequency conversion includes: obtaining a radio frequency signal after performing radio frequency conversion on the baseband signal; and sending out the radio frequency signal when a preset period arrives.

According to a sixth aspect, an embodiment provides a synchronization signal receiving method, including: receiving a synchronization signal, where the synchronization signal is generated by a transmit end according to one or more sequences, and a length or lengths of the one or more sequences are determined according to a length of the synchronization signal; and detecting the synchronization signal, to obtain synchronization between the transmit end and a receive end of the synchronization signal.

With reference to the sixth aspect, in a first possible implementation manner of the sixth aspect, the sequence is generated according to an m-sequence, a ZC sequence, or a combination thereof.

With reference to the sixth aspect or the first possible implementation manner of the sixth aspect, in a second possible implementation manner of the sixth aspect, if the sequence is an m-sequence with a length of 31, a primitive polynomial for generating the one or more sequences is any one or any combination of the following polynomials:

$$x(\bar{i}+5)=(x(\bar{i}+2)+x(\bar{i}))\bmod 2$$

$$x(\bar{i}+5)=(x(\bar{i}+3)+x(\bar{i}))\bmod 2$$

$$x(\bar{i}+5)=(x(\bar{i}+3)+x(\bar{i}+2)+x(\bar{i}+1)+x(\bar{i}))\bmod 2$$

$$x(\bar{i}+5)=(x(\bar{i}+4)+x(\bar{i}+2)+x(\bar{i}+1)+x(\bar{i}))\bmod 2$$

$$x(\bar{i}+5)=(x(\bar{i}+4)+x(\bar{i}+3)+x(\bar{i}+1)+x(\bar{i}))\bmod 2$$

$$x(\bar{i}+5)=(x(\bar{i}+4)+x(\bar{i}+3)+x(\bar{i}+2)+x(\bar{i}))\bmod 2$$

where $\bar{i}$ is an integer, a value range of $\bar{i}$ is $0 \le \bar{i} \le 25$, and mod 2 represents a modulo operation of division by 2.

With reference to the sixth aspect or the first possible implementation manner of the sixth aspect, in a third possible implementation manner of the sixth aspect, if the sequence is an m-sequence with a length of 63, a primitive polynomial for generating the one or more sequences is any one or any combination of the following polynomials:

$$x(\bar{i}+6)=(x(\bar{i}+1)+x(\bar{i}))\bmod 2$$

$$x(\bar{i}+6)=(x(\bar{i}+4)+x(\bar{i}+3)+x(\bar{i}+1)+x(\bar{i}))\bmod 2$$

$$x(\bar{i}+6)=(x(\bar{i}+5)+x(\bar{i}))\bmod 2$$

$$x(\bar{i}+6)=(x(\bar{i}+5)+x(\bar{i}+2)+x(\bar{i}+1)+x(\bar{i}))\bmod 2$$

$$x(\bar{i}+6)=(x(\bar{i}+5)+x(\bar{i}+3)+x(\bar{i}+2)+x(\bar{i}))\bmod 2$$

$$x(\bar{i}+6)=(x(\bar{i}+5)+x(\bar{i}+4)+x(\bar{i}+1)+x(\bar{i}))\bmod 2,$$

where $\bar{i}$ is an integer, a value range of $\bar{i}$ is $0 \le \bar{i} \le 56$, and mod 2 represents a modulo operation of division by 2.

With reference to the sixth aspect or any one of the first to the third possible implementation manners of the sixth aspect, in a fourth possible implementation manner of the sixth aspect, the method further includes: detecting, according to a preset criterion, whether the synchronization signal is received; and if the synchronization signal is not detected, sending, as the transmit end, a synchronization signal generated by the receive end to another receive end.

In a D2D communication scenario, a value of cross-correlation between synchronization signals provided in the embodiments is small, which can reduce synchronization detection time. Therefore, a receive end of the synchronization signals can implement quick synchronization with a transmit end according to the synchronization signals, thereby improving system performance.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

Figure 1:
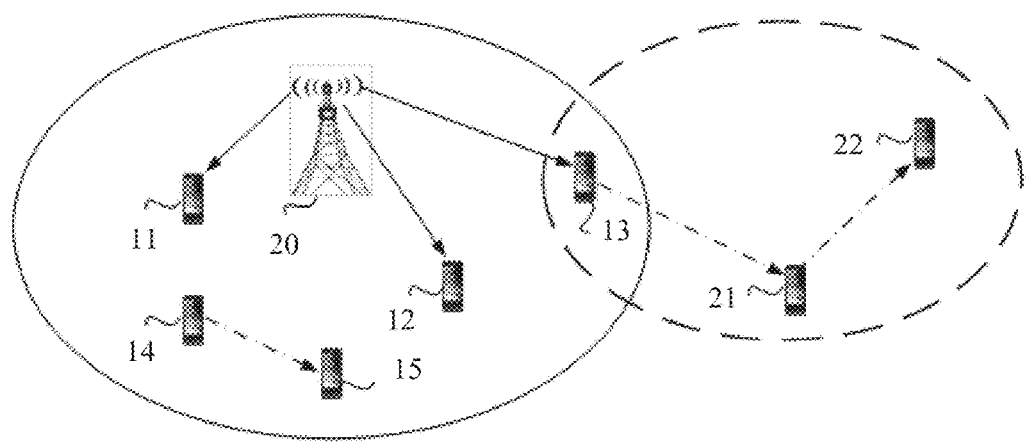
FIG. 1 is a schematic diagram of device to device (D2D) communication scenarios with network coverage and with partial network coverage.

FIG. 1 is a schematic diagram of device to device (D2D) communication scenarios with network coverage and with partial network coverage. As shown in FIG. 1, the left side of FIG. 1 shows a communication scenario with network coverage. In FIG. 1, user equipments (UEs) served by a base station 10, that is, UE 11, UE 12, and UE 13, receive a synchronization signal sent by the base station 10 in the downlink, and the UEs synchronize with the base station 10 by using the foregoing synchronization signal. In addition, UE 14 and UE 15 are also within a service range of the base station 10, but fail to wirelessly connect to the base station 10 for some reasons, for example, an obstruction of a wall or a building. Therefore, when the UE 14 is to initiate D2D communication with the UE 15, because there is no assistance of a network, the UE 14, as a synchronization source, sends a D2D synchronization signal (D2DSS), so that the receive end UE 15 is synchronized with the UE 14 by using the D2DSS.

It should be additionally noted that the UE 13 is within the service range of the base station 10, but the UE 13 detects some UEs, for example, UE 21 listed in FIG. 1, is near the UE 13, and the UE 21 is in an area which is out of network service. In this case, because the UE 13 has been synchronized with the base station 10, the UE 13 has a higher priority as a possible synchronization source. Therefore, the UE 13 can play a role of a synchronization source to initial a D2DSS, so that the UE 21 is synchronized with the UE 13. Likewise, the UE 21 may continue to send a D2DSS, so that UE 22 following the UE 21 is synchronized.

Figure 2:
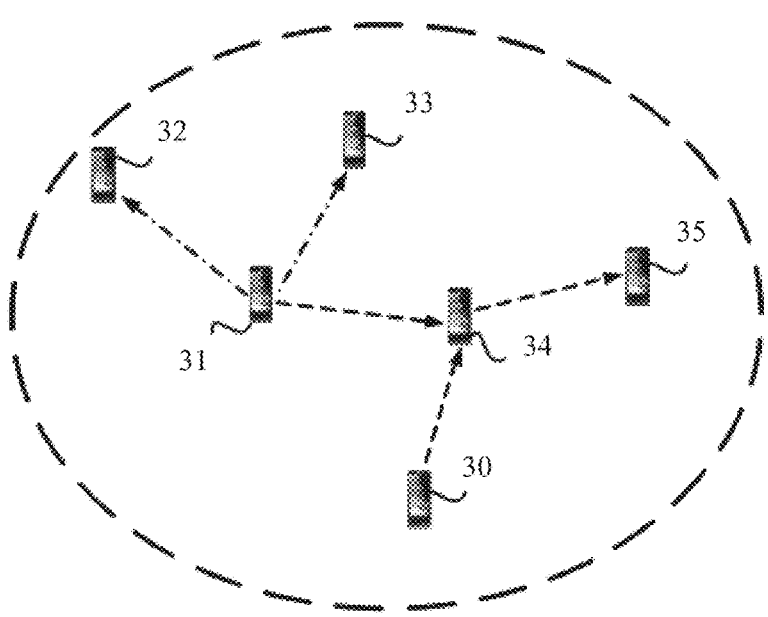
FIG. 2 is a schematic diagram of a D2D communication scenario without network coverage.

FIG. 2 is a schematic diagram of a D2D communication scenario without network coverage. As shown in FIG. 2, in a case in which UE 31 does not receive a synchronization signal, the UE 31, as a synchronization source, sends a D2DSS to nearby UEs, and the UEs such as UE 32, UE 33, and UE 34 near the UE 31 receive the D2DSS. Further, the UE 34 sends a D2DSS to UE 35. However, UE 30 cannot even receive the D2DSS sent by the UE 31, and therefore the UE 30 sends another D2DSS to UE near the UE 30 (for example, the UE 34).

It can be learned from the foregoing description that, a scenario of transmitting a synchronization signal in a D2D communication mode is more complex than that in a cellular mobile communications system, and involves transmission of synchronization signals from a synchronization source (such as the UE 13 or the UE 21) that forwards timing of the base station, and from a completely distributed synchronization source (such as the UE 14, the UE 31, the UE 30, or the UE 34).

Based on the foregoing communication scenario, and with reference to specific embodiments, the following describes in detail a synchronization signal sending method, apparatus, and device that are provided in the embodiments.

Figure 3:
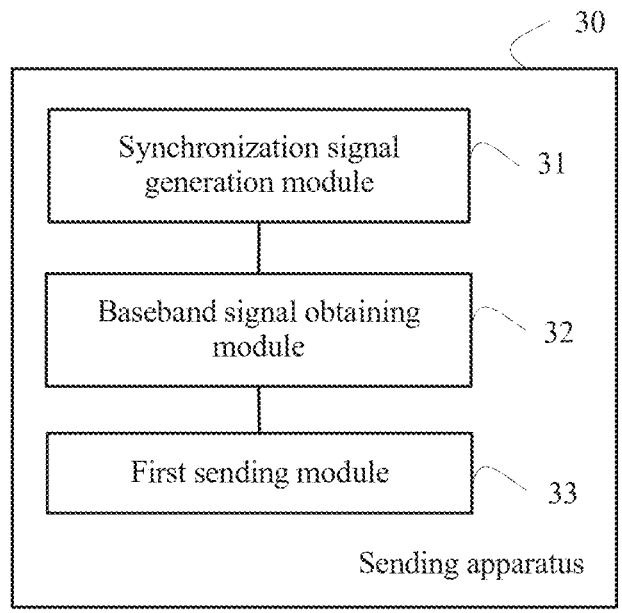
FIG. 3 is a schematic structural diagram of Embodiment 1 of a synchronization signal sending apparatus according to the embodiments.

FIG. 3 is a schematic structural diagram of Embodiment 1 of a synchronization signal sending apparatus according to the embodiments. This embodiment provides the synchronization signal sending apparatus, and the apparatus may be integrated in a signal sending device such as UE or a base station. As shown in FIG. 3, the synchronization signal sending apparatus 30 includes a synchronization signal generation module 31, a baseband signal obtaining module 32, and a first sending module 33.

The synchronization signal generation module 31 is configured to generate a synchronization signal according to one or more sequences, where a length or lengths of the one or more sequences are determined according to a length of the synchronization signal. The baseband signal obtaining module 32 is configured to obtain a baseband signal according to the synchronization signal generated by the synchronization signal generation module 31. The first sending module 33 is configured to send, after performing radio frequency conversion, out the baseband signal obtained by the baseband signal obtaining module 32.

Figure 8:
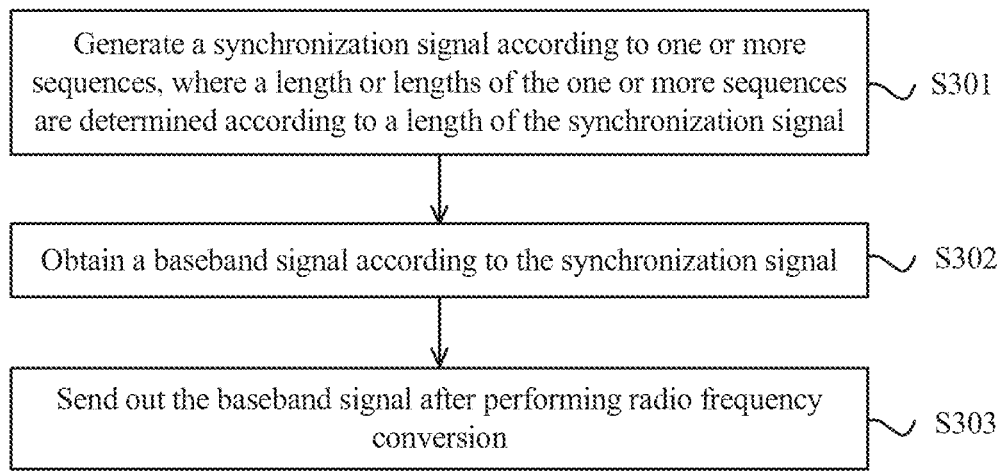
FIG. 8 is a schematic flowchart of Embodiment 1 of a synchronization signal sending method according to the embodiments.

The apparatus in this embodiment may be configured to execute a technical solution of a method embodiment shown in FIG. 8, and an implementation principle and a technical effect of the technical solution are similar to those of this embodiment and are not further described herein.

In the foregoing embodiment, the sequence includes a first sequence, and the synchronization signal generation module 31 may include a synchronization signal generation unit, configured to: determine a length or lengths of one or more first sequences according to the length of the synchronization signal; determine a first preset value or first preset values corresponding to the one or more first sequences, where the first preset value corresponding to each first sequence is independent; and perform cyclic shifting on the one or more first sequences according to the first preset value or the first preset values, to generate the synchronization signal.

Further, the sequence further includes a second sequence, and the synchronization signal generation module 31 may further include a scrambling unit, configured to: generate a scrambling sequence according to one or more second sequences, and perform, by using the scrambling sequence, scrambling processing at least one time on the synchronization signal generated by the synchronization signal generation unit. The baseband signal obtaining module 32 may be specifically configured to obtain the baseband signal according to the synchronization signal undergoing the scrambling processing performed by the scrambling unit. In this embodiment, a peak-to-average ratio of the synchronization signal can be reduced by using the foregoing scrambling sequence.

Optionally, the scrambling unit may be specifically configured to: determine a length or lengths of the one or more second sequences according to the length of the synchronization signal; determine a second preset value or second preset values corresponding to the one or more second sequences, where all second sequences are corresponding to one second preset value or different second preset values, and second preset values of scrambling sequences corresponding to all synchronization sources in a group are the same; and perform cyclic shifting on each second sequence according to the second preset value, to generate the scrambling sequence. In this embodiment, a cyclic shift value (that is, a second preset value) corresponding to the scrambling sequence is obtained according to a group identity. In a D2D group, scrambling sequences used for different synchronization signals have one cyclic shift, so as to improve related performance between synchronization signals in the group, and provide scalability for configuration of inter-group synchronization signals. Further, when there are multiple scrambling sequences, at least one scrambling sequence is corresponding to one second preset value in the group, and the other scrambling sequences are corresponding to different second preset values. In addition, cyclic shifts of scrambling sequences in different D2D groups may be indicated in an explicit or implicit manner.

It should be additionally noted that, in any embodiment, either the first preset value or the second preset value is determined according to the group identity, and the sequence is generated according to an m-sequence, a Zadoff-Chu (ZC) sequence, or a combination thereof. That is, the synchronization signal is generated according to the m-sequence, or the synchronization signal is generated according to the ZC sequence, or the synchronization signal is generated according to both the m-sequence and the ZC sequence.

For a ZC sequence with a specific sequence length value Q, a different root sequence number u is corresponding to a different ZC sequence.

The m-sequence is a sequence that has a longest period and that can be generated by an m-stage shift register. A length of the m-sequence is $2^m-1$, that is, the length of the m-sequence may be 7, 15, 31, 63, 127, 255, or the like. The m-sequence is a binary sequence.

On the foregoing basis, it is assumed that a preset value includes the first preset value and the second preset value, and the synchronization signal generation unit and the scrambling unit may be further configured to determine the preset value according to the following formula:

$$f(N_{GID})=a*N_{GID}+b, \text{ or}$$

$$f(N_{GID})(a*N_{GID}+b)\bmod K, \text{ where}$$

$N_{GID}$ represents the group identity; a and b are predefined constants; $f(N_{GID})$ represents the preset value; K is a constant defined by a system; and mod represents a modulo operation.

In the foregoing embodiment, the group identity is a function of a PD2DSS identity, or is carried in a first control instruction delivered by a network, or is carried in a second control instruction delivered by a transmit device, or is implicitly indicated by a network. Specifically, in a D2D scenario with network coverage, the first control instruction may be sent to a D2D synchronization signal transmit end by using the network. The first control instruction carries the group identity. Optionally, the group identity may be carried in the first control instruction delivered by the network. For example, in a long term evolution (LTE) system, the first control instruction may be downlink control information (DCI) or radio resource control (RRC) signaling that is sent by an evolved NodeB (eNB) in the downlink by using a cellular link. If the network configures one group identity for different D2D synchronization signal transmit ends, the D2D synchronization signal transmit ends belong to one group. If the network configures different group identities for different D2D synchronization signal transmit ends, the D2D synchronization signal transmit ends belong to different groups. Optionally, the group identity may be an identity carried in control signaling used in D2D, scheduling assignment (SA for short), so as to instruct UE that receives the SA signaling to generate a group identity of a synchronization signal.

In addition, for different first sequences, the synchronization signal generation unit may be further configured to: determine an ID of the synchronization signal according to the first preset values corresponding to all the first sequences, or determine an ID of the synchronization signal according to the PD2DSS identity and the first preset values corresponding to all the first sequences; or determine an ID of the synchronization signal according to any one of the first preset values of all the first sequences; or determine an ID of the synchronization signal according to the PD2DSS identity and any one of the first preset values of all the first sequences.

Optionally, the baseband signal obtaining module 32 may include: a mapping unit, configured to map the synchronization signal to a subcarrier, to obtain a frequency domain signal; and an obtaining unit, configured to obtain a time domain signal according to the frequency domain signal obtained by the mapping unit.

The mapping the synchronization signal to a subcarrier, to obtain a frequency domain signal may be specifically: separately mapping all sequences included in the synchronization signal to the subcarrier, to obtain a frequency domain subcarrier signal corresponding to all the sequences, and further obtain the frequency domain signal, where the frequency domain signal includes the frequency domain subcarrier signal. For example, two sequences with a length of 31 may be respectively mapped to odd and even subcarriers, or may separately occupy 31 consecutive subcarriers, or may be mapped to total 62 subcarriers in one-to-one correspondence in another manner. For a sequence with a length of 63, a method for mapping the sequence to 63 subcarriers is similar to that in the foregoing example. The sequence with the length of 63 may be mapped to 63 consecutive subcarriers, or may be mapped to the 63 subcarriers in one-to-one correspondence by using any other method.

In a feasible mapping manner, the synchronization signal includes at least one first synchronization signal and at least one second synchronization signal, and first sequences corresponding to all first synchronization signals and all second synchronization signals are the same or different. The mapping unit may be specifically configured to: respectively map all the first synchronization signals to first locations corresponding to all the first synchronization signals, and respectively map all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

In another feasible mapping manner, the synchronization signal may further include at least one third synchronization signal, and a sequence corresponding to the third synchronization signal is the same as or different from a sequence corresponding to the first synchronization signal or the second synchronization signal. The mapping unit may be further configured to respectively map all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

In addition, a quantity of sequences for generating the synchronization signal depends on a length of a sequence that can be used by the synchronization signal. One or more sequences with a length are determined according to the length of the synchronization signal, to generate the synchronization signal. For example, the length of the synchronization signal does not exceed 72, and if an m-sequence is used, a preferable length of the sequence is 62 or 63. When the length of the synchronization signal is 62, it is determined that the synchronization signal with a length of 62 may be generated by using two m-sequences with a length of 31; or when the length of the synchronization signal is 63, it is determined that the synchronization signal with the length of 63 may be generated by using one m-sequence with a length of 63. Other similar cases are not listed herein one by one.

In an actual application of this embodiment, if the sequence is an m-sequence with a length of 31, a primitive polynomial of the one or more sequences is any one or any combination of the following polynomials:

$$x(\bar{i}+5)=(x(\bar{i}+2)+x(\bar{i}))\bmod 2$$

$$x(\bar{i}+5)=(x(\bar{i}+3)+x(\bar{i}))\bmod 2$$

$$x(\bar{i}+5)=(x(\bar{i}+3)+x(\bar{i}+2)+x(\bar{i}+1)+x(\bar{i}))\bmod 2$$

$$x(\bar{i}+5)=(x(\bar{i}+4)+x(\bar{i}+2)+x(\bar{i}+1)+x(\bar{i})) \bmod 2$$

$$x(\bar{i}+5)=(x(\bar{i}+4)+x(\bar{i}+3)+x(\bar{i}+1)+x(\bar{i})) \bmod 2$$

$$x(\bar{i}+5)=(x(\bar{i}+4)+x(\bar{i}+3)+x(\bar{i}+2)+x(\bar{i})) \bmod 2, \text{ where}$$

$\bar{i}$ is an integer, a value range of $\bar{i}$ is $0 \leq \bar{i} \leq 25$, and mod 2 represents a modulo operation of division by 2.

In another actual application of this embodiment, if the sequence is an m-sequence with a length of 63, a primitive polynomial of the one or more sequences is any one or any combination of the following polynomials:

$$x(\bar{i}+6)=(x(\bar{i}+1)+x(\bar{i})) \bmod 2$$

$$x(\bar{i}+6)=(x(\bar{i}+4)+x(\bar{i}+3)+x(\bar{i}+1)+x(\bar{i})) \bmod 2$$

$$x(\bar{i}+6)=(x(\bar{i}+5)+x(\bar{i})) \bmod 2$$

$$x(\bar{i}+6)=(x(\bar{i}+5)+x(\bar{i}+2)+x(\bar{i}+1)+x(\bar{i})) \bmod 2$$

$$x(\bar{i}+6)=(x(\bar{i}+5)+x(\bar{i}+3)+x(\bar{i}+2)+x(\bar{i})) \bmod 2$$

$$x(\bar{i}+6)=(x(\bar{i}+5)+x(\bar{i}+4)+x(\bar{i}+1)+x(\bar{i})) \bmod 2,$$

where $\bar{i}$ is an integer, a value range of $\bar{i}$ is $0 \leq \bar{i} \leq 56$, and mod 2 represents a modulo operation of division by 2.

Further, the obtaining unit may be specifically configured to: obtain the baseband signal from the frequency domain signal by means of OFDM, or obtain the baseband signal from the frequency domain signal by means of SC-FDMA.

When the obtaining unit obtains the baseband signal from the frequency domain signal by means of OFDM, the obtaining unit is specifically configured to obtain the baseband signal according to the following formula:

$$s(t) = \sum_{k=-\lfloor N/2 \rfloor}^{-1} a_{k(-)} \cdot e^{j2\pi k \Delta f^* t} + \sum_{k=1}^{\lceil N/2 \rceil} a_{k(+)} \cdot e^{j2\pi k \Delta f^* t},$$

where t represents a time independent variable of the baseband signal s(t);

$$k^{(-)}=k+\lfloor N/2 \rfloor, k^{(+)}=k+\lfloor N/2 \rfloor-1;$$

$\Delta f$ is a subcarrier spacing; $a_k$ is a value obtained after frequency domain data is mapped to a corresponding subcarrier; $N=N_{RB}^{DL} N_{sc}^{RB}$, where $N_{RB}^{DL}$ represents a quantity of resource blocks (RB for short) configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

When the obtaining unit obtains the baseband signal from the frequency domain signal by means of SC-FDMA, the obtaining unit is specifically configured to obtain the baseband signal according to the following formula:

$$s(t) = \sum_{k=-\lfloor N/2 \rfloor}^{\lceil N/2 \rceil-1} a_{k(-)} \cdot e^{j2\pi(k+1/2)\Delta f^* t},$$

where t represents a time independent variable of the baseband signal s(t);

$$k^{(-)}=k+\lfloor N/2 \rfloor;$$

$\Delta f$ is a subcarrier spacing; $a_k$ is a value obtained after frequency domain data is mapped to a corresponding subcarrier;

$$N=N_{RB}^{UL} N_{sc}^{RB},$$

where $N_{RB}^{UL}$ represents a quantity of RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

Figure 4:
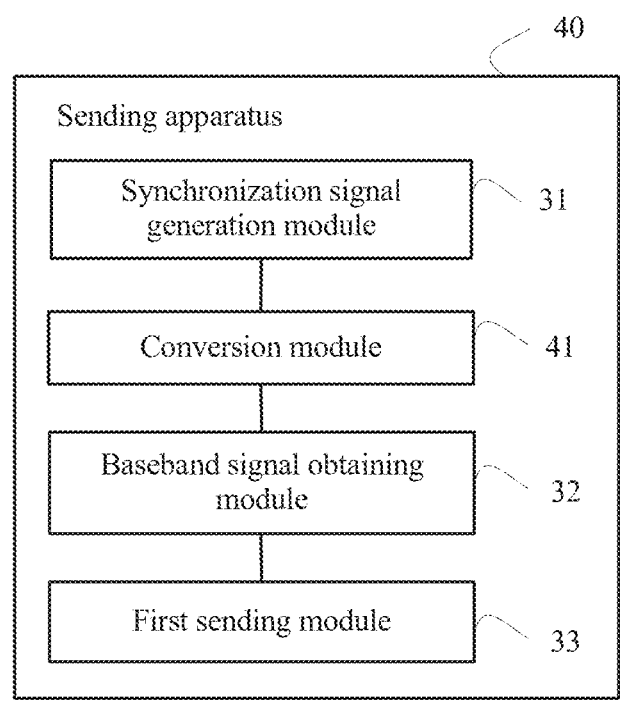
FIG. 4 is a schematic structural diagram of Embodiment 2 of a synchronization signal sending apparatus according to the embodiments.

FIG. 4 is a schematic structural diagram of Embodiment 2 of a synchronization signal sending apparatus according to the embodiments. As shown in FIG. 4, this embodiment is based on the embodiment shown in FIG. 3. Further, the apparatus 40 may further include: a conversion module 41, configured to perform DFT on the synchronization signal, to obtain a converted signal. The obtaining unit is configured to map the converted signal to a subcarrier by means of SC-FDMA, to obtain the baseband signal.

Figure 12:
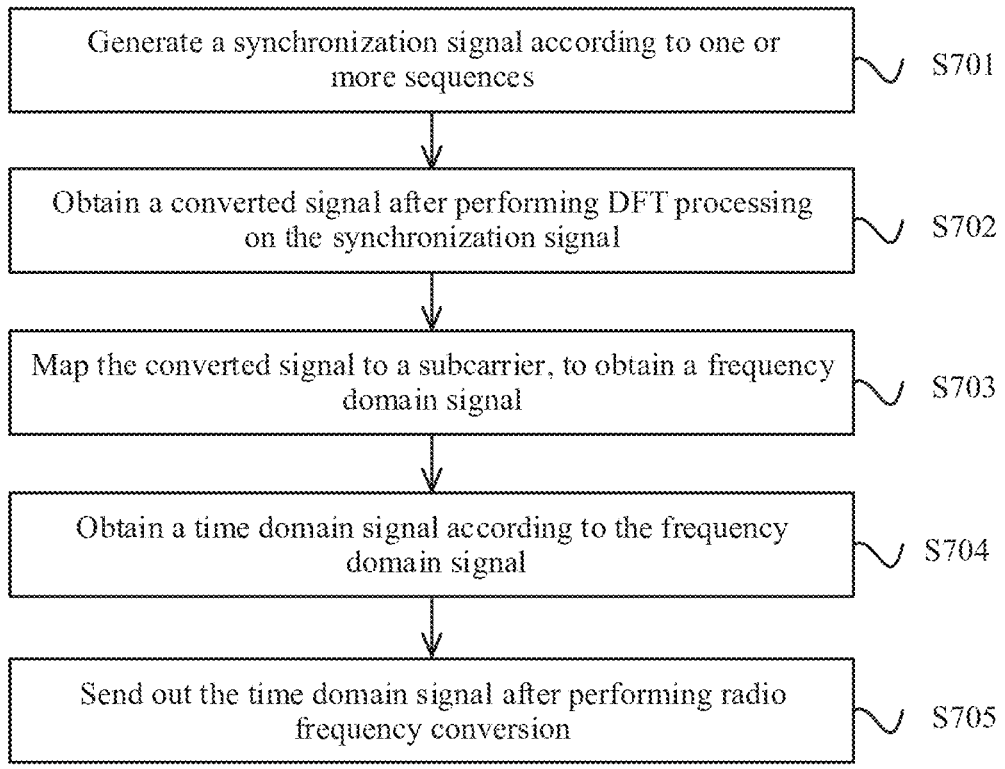
FIG. 12 is a schematic flowchart of Embodiment 5 of a synchronization signal sending method according to the embodiments.

The apparatus in this embodiment may be configured to execute a technical solution of a method embodiment shown in FIG. 12, and an implementation principle and a technical effect of the technical solution are similar to those of this embodiment and are not further described herein.

In this embodiment, the conversion module 41 may be specifically configured to obtain the converted signal according to the following formula:

$$b(n) = \frac{1}{\sqrt{L}} \sum_{l=0}^{L-1} d(l) e^{-\frac{2\pi j}{L} l^* n},$$

where l represents an independent variable of the synchronization signal d(l); L is the length of the synchronization signal; b(n) represents the converted signal obtained after DFT is performed on the synchronization signal, where $0 \leq n \leq L-1$; and j represents an imaginary unit.

Based on the foregoing embodiments, the first sending module 33 may be specifically configured to: obtain a radio frequency signal after performing radio frequency conversion on the baseband signal; and send out the radio frequency signal when a preset period arrives.

In a D2D communication scenario, a value of cross-correlation between synchronization signals generated by the synchronization signal sending apparatus provided in this embodiment is relatively small, which can reduce synchronization detection time of a receive end of the synchronization signals. Therefore, the receive end of the synchronization signals can implement quick synchronization with a transmit end according to the synchronization signals, thereby improving system performance.

Figure 5:
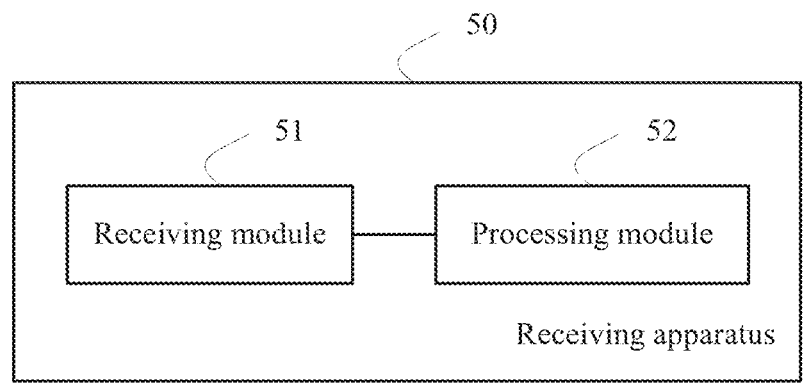
FIG. 5 is a schematic structural diagram of Embodiment 1 of a synchronization signal receiving apparatus according to the embodiments.

FIG. 5 is a schematic structural diagram of Embodiment 1 of a synchronization signal receiving apparatus according to the embodiments. This embodiment provides the synchronization signal receiving apparatus, and the apparatus may be integrated in a signal receiving device such as UE or a base station. As shown in FIG. 5, the synchronization signal receiving apparatus 50 includes a receiving module 51 and a processing module 52.

The receiving module 51 is configured to receive a synchronization signal, where the synchronization signal is generated by a transmit end according to one or more sequences, and a length or lengths of the one or more sequences are determined according to a length of the synchronization signal. The processing module 52 is configured to detect the synchronization signal received by the receiving module 51, to obtain synchronization with the transmit end of the synchronization signal.

The synchronization signal receiving apparatus in this embodiment and the sending apparatus shown in FIG. 3 or FIG. 4 are disposed correspondingly. After receiving a synchronization signal sent by a sending apparatus, the receiving apparatus implements synchronization with the sending apparatus, to perform D2D communication. In addition, the sending apparatus and the receiving apparatus may be disposed separately and independently, or may be integrated in one communication device (for example, a mobile phone), that is, a communication device may serve as both a sending apparatus and a receiving apparatus.

Figure 13:
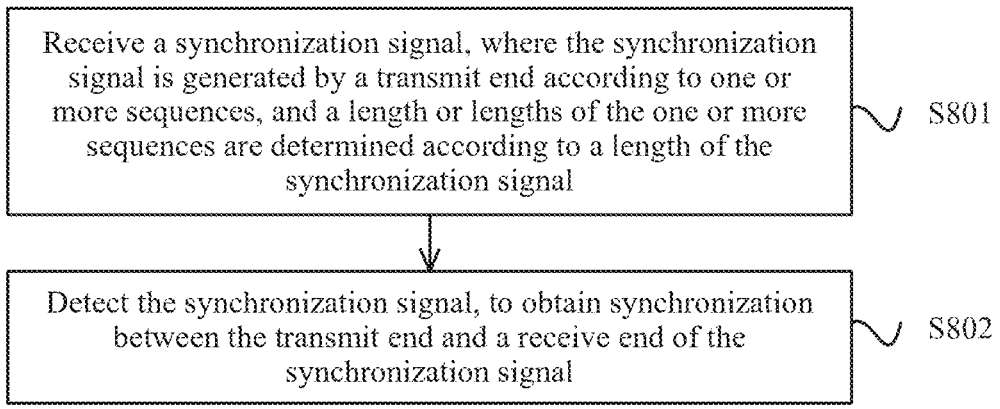
FIG. 13 is a schematic flowchart of Embodiment 1 of a synchronization signal receiving method according to the embodiments.

The apparatus in this embodiment may be configured to execute a technical solution of a method embodiment shown in FIG. 13, and an implementation principle and a technical effect of the technical solution are similar to those of this embodiment and are not further described herein.

In the foregoing embodiment, the sequence may be generated according to an m-sequence, a ZC sequence, or a combination thereof.

Optionally, if the sequence is an m-sequence with a length of 31, a primitive polynomial for generating the one or more sequences is any one or any combination of the following polynomials:

$$x(\bar{i}+5)=(x(\bar{i}+2)+x(\bar{i})) \bmod 2$$

$$x(\bar{i}+5)=(x(\bar{i}+3)+x(\bar{i})) \bmod 2$$

$$x(\bar{i}+5)=(x(\bar{i}+3)+x(\bar{i}+2)+x(\bar{i}+1)+x(\bar{i})) \bmod 2$$

$$x(\bar{i}+5)=(x(\bar{i}+4)+x(\bar{i}+2)+x(\bar{i}+1)+x(\bar{i})) \bmod 2$$

$$x(\bar{i}+5)=(x(\bar{i}+4)+x(\bar{i}+3)+x(\bar{i}+1)+x(\bar{i})) \bmod 2$$

$$x(\bar{i}+5)=(x(\bar{i}+4)+x(\bar{i}+3)+x(\bar{i}+2)+x(\bar{i})) \bmod 2,$$

where $\bar{i}$ is an integer, a value range of $\bar{i}$ is $0 \leq \bar{i} \leq 25$, and mod 2 represents a modulo operation of division by 2.

Optionally, if the sequence is an m-sequence with a length of 63, a primitive polynomial for generating the one or more sequences is any one or any combination of the following polynomials:

$$x(\bar{i}+6)=(x(\bar{i}+1)+x(\bar{i})) \bmod 2$$

$$x(\bar{i}+6)=(x(\bar{i}+4)+x(\bar{i}+3)+x(\bar{i}+1)+x(\bar{i})) \bmod 2$$

$$x(\bar{i}+6)=(x(\bar{i}+5)+x(\bar{i})) \bmod 2$$

$$x(\bar{i}+6)=(x(\bar{i}+5)+x(\bar{i}+2)+x(\bar{i}+1)+x(\bar{i})) \bmod 2$$

$$x(\bar{i}+6)=(x(\bar{i}+5)+x(\bar{i}+3)+x(\bar{i}+2)+x(\bar{i})) \bmod 2$$

$$x(\bar{i}+6)=(x(\bar{i}+5)+x(\bar{i}+4)+x(\bar{i}+1)+x(\bar{i})) \bmod 2,$$

where $\bar{i}$ is an integer, a value range of $\bar{i}$ is $0 \leq \bar{i} \leq 56$, and mod 2 represents a modulo operation of division by 2.

On the foregoing basis, the apparatus 50 may further include a second sending module, and the processing module 52 may be further configured to: detect, according to a preset criterion, whether the receiving module 51 receives the synchronization signal; and if the synchronization signal is not detected, trigger the second sending module to send a synchronization signal generated by the apparatus to another receive end. Optionally, in this embodiment, the second sending module may be disposed independently, or may be integrated with the receiving module 51, which is not limited in the embodiments.

Figure 6:
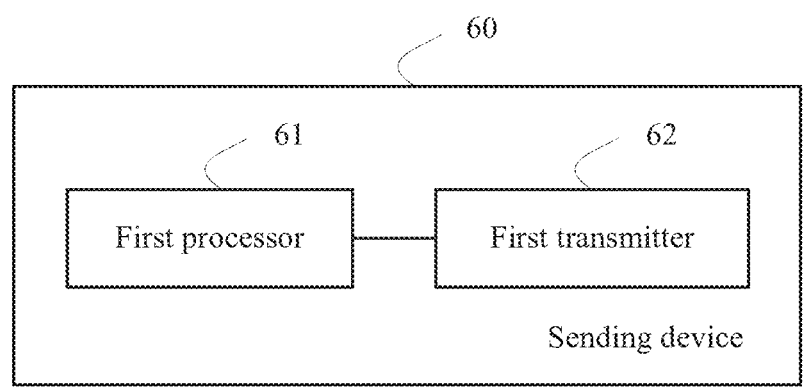
FIG. 6 is a schematic structural diagram of Embodiment 1 of a synchronization signal sending device according to the embodiments.

FIG. 6 is a schematic structural diagram of Embodiment 1 of a synchronization signal sending device according to the embodiments. This embodiment provides the synchronization signal sending device, and the device may be integrated in a signal sending device such as UE or a base station. As shown in FIG. 6, the synchronization signal sending device 60 includes a first processor 61 and a first transmitter 62.

The first processor 61 is configured to: generate a synchronization signal according to one or more sequences, where a length or lengths of the one or more sequences are determined according to a length of the synchronization signal; and obtain a baseband signal according to the synchronization signal. The first transmitter 62 is configured to send, after performing radio frequency conversion, out the baseband signal obtained by the first processor 61.

The device in this embodiment may be configured to execute a technical solution of a method embodiment shown in FIG. 8 or FIG. 12, and an implementation principle and a technical effect of the technical solution are similar to those of this embodiment and are not further described herein.

In the foregoing embodiment, the sequence may include a first sequence, and the first processor 61 may be specifically configured to: determine a length or lengths of one or more first sequences according to the length of the synchronization signal; determine a first preset value or first preset values corresponding to the one or more first sequences, where the first preset value corresponding to each first sequence is independent; and perform cyclic shifting on the one or more first sequences according to the first preset value or the first preset values, to generate the synchronization signal.

Optionally, the sequence may further include a second sequence, and the first processor 61 may be further configured to: generate a scrambling sequence according to one or more second sequences; and perform scrambling processing at least one time on the synchronization signal by using the scrambling sequence. The obtaining a baseband signal according to the synchronization signal is specifically: obtaining the baseband signal according to the synchronization signal undergoing the scrambling processing.

Further, a specific process in which the first processor 61 generates a scrambling sequence according to one or more second sequences is: determining a length or lengths of the one or more second sequences according to the length of the synchronization signal; determining a second preset value or second preset values corresponding to the one or more second sequences, where all second sequences are corresponding to one second preset value or different second preset values, and second preset values of scrambling sequences corresponding to all synchronization sources in a group are the same; and performing cyclic shifting on each second sequence according to the second preset value, to generate the scrambling sequence.

Still further, when there are multiple scrambling sequences, at least one scrambling sequence is corresponding to one second preset value in the group, and the other scrambling sequences are corresponding to different second preset values.

Either the first preset value or the second preset value is determined according to a group identity. It is assumed that a preset value includes the first preset value and the second preset value, and the first processor 61 may be further configured to determine the preset value according to the following formula:

$f(N_{GID})=a*N_{GID}+b$, or $f(N_{GID})=(a*N_{GID}+b) \bmod K$, where $N_{GID}$ represents the group identity; a and b are predefined constants; $f(N_{GID})$ represents the preset value; K is a constant defined by a system; and mod represents a modulo operation.

It should be noted that the group identity is a function of a PD2DSS identity, or is carried in a first control instruction delivered by a network, or is carried in a second control instruction delivered by a transmit device, or is implicitly indicated by a network; and the sequence is generated according to an m-sequence, a ZC sequence, or a combination thereof.

For different first sequences, the first processor 61 may be further configured to: determine an ID of the synchronization signal according to the first preset values corresponding to all the first sequences, or determine an ID of the synchronization signal according to the PD2DSS identity and the first preset values corresponding to all the first sequences; or determine an ID of the synchronization signal according to any one of the first preset values of all the first sequences; or determine an ID of the synchronization signal according to the PD2DSS identity and any one of the first preset values of all the first sequences.

In the foregoing embodiment, that the first processor 61 is configured to obtain a baseband signal according to the synchronization signal is specifically: the first processor 61 is configured to: map the synchronization signal to a subcarrier, to obtain a frequency domain signal; and obtain a time domain signal according to the frequency domain signal.

Further, the synchronization signal includes at least one first synchronization signal and at least one second synchronization signal, and first sequences corresponding to all first synchronization signals and all second synchronization signals are the same or different. That the first processor 61 is configured to map the synchronization signal to a subcarrier, to obtain a frequency domain signal is specifically: the first processor 61 is configured to respectively map all the first synchronization signals to first locations corresponding to all the first synchronization signals, and respectively map all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

Still further, the synchronization signal further includes at least one third synchronization signal, and a sequence corresponding to the third synchronization signal is the same as or different from a sequence corresponding to the first synchronization signal or the second synchronization signal. That the first processor 61 is configured to map the synchronization signal to a subcarrier, to obtain a frequency domain signal is specifically: the first processor 61 is configured to respectively map all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

On the foregoing basis, in a scenario, if the sequence is an m-sequence with a length of 31, a primitive polynomial of the one or more sequences is any one or any combination of the following polynomials:

$x(\bar{i}+5)=(x(\bar{i}+2)+x(\bar{i})) \bmod 2$ $x(\bar{i}+5)=(x(\bar{i}+3)+x(\bar{i})) \bmod 2$ $x(\bar{i}+5)=(x(\bar{i}+3)+x(\bar{i}+2)+x(\bar{i}+1)+x(\bar{i})) \bmod 2$ $x(\bar{i}+5)=(x(\bar{i}+4)+x(\bar{i}+2)+x(\bar{i}+1)+x(\bar{i})) \bmod 2$ $x(\bar{i}+5)=(x(\bar{i}+4)+x(\bar{i}+3)+x(\bar{i}+1)+x(\bar{i})) \bmod 2$ $x(\bar{i}+5)=(x(\bar{i}+4)+x(\bar{i}+3)+x(\bar{i}+2)+x(\bar{i})) \bmod 2$, where $\bar{i}$ is an integer, a value range of $\bar{i}$ is $0 \leq \bar{i} \leq 25$, and mod 2 represents a modulo operation of division by 2.

In another scenario, if the sequence is an m-sequence with a length of 63, a primitive polynomial of the one or more sequences is any one or any combination of the following polynomials:

$x(\bar{i}+6)=(x(\bar{i}+1)+x(\bar{i})) \bmod 2$ $x(\bar{i}+6)=(x(\bar{i}+4)+x(\bar{i}+3)+x(\bar{i}+1)+x(\bar{i})) \bmod 2$ $x(\bar{i}+6)=(x(\bar{i}+5)+x(\bar{i})) \bmod 2$ $x(\bar{i}+6)=(x(\bar{i}+5)+x(\bar{i}+2)+x(\bar{i}+1)+x(\bar{i})) \bmod 2$ $x(\bar{i}+6)=(x(\bar{i}+5)+x(\bar{i}+3)+x(\bar{i}+2)+x(\bar{i})) \bmod 2$ $x(\bar{i}+6)=(x(\bar{i}+5)+x(\bar{i}+4)+x(\bar{i}+1)+x(\bar{i})) \bmod 2$, where $\bar{i}$ is an integer, a value range of $\bar{i}$ is $0 \leq \bar{i} \leq 56$, and mod 2 represents a modulo operation of division by 2.

In the foregoing embodiment, that the first processor 61 is configured to obtain a time domain signal according to the frequency domain signal is specifically: the first processor 61 is configured to obtain the baseband signal from the frequency domain signal by means of OFDM, or the first processor 61 is configured to obtain the baseband signal from the frequency domain signal by means of SC-FDMA.

In an embodiment for obtaining the baseband signal, that the first processor 61 is configured to obtain the baseband signal from the frequency domain signal by means of OFDM is specifically: the first processor 61 is configured to obtain the baseband signal according to the following formula:

$$s(t) = \sum_{k=-\lfloor N/2 \rfloor}^{-1} a_{k(-)} \cdot e^{j2\pi k \Delta f^* t} + \sum_{k=1}^{\lceil N/2 \rceil} a_{k(+)} \cdot e^{j2\pi k \Delta f^* t},$$

where t represents a time independent variable of the baseband signal s(t);

$k^{(-)}=k+\lfloor N/2 \rfloor, k^{(+)}=k+\lfloor N/2 \rfloor -1$;

$\Delta f$ is a subcarrier spacing; $a_k$ is a value obtained after frequency domain data is mapped to a corresponding subcarrier;

$N=N_{RB}^{DL} N_{sc}^{RB}$, where $N_{RB}^{DL}$ represents a quantity of RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

In another embodiment for obtaining the baseband signal, that the first processor 61 is configured to obtain the baseband signal from the frequency domain signal by means of SC-FDMA is specifically: the first processor 61 is configured to obtain the baseband signal according to the following formula:

$$s(t) = \sum_{k=-\lfloor N/2 \rfloor}^{\lceil N/2 \rceil - 1} a_{k(-)} \cdot e^{j2\pi(k+1/2)\Delta f^* t},$$

where t represents a time independent variable of the baseband signal s(t);

$$k^{(-)} = k + \lfloor N/2 \rfloor;$$

$\Delta f$ is a subcarrier spacing; $a_k$ is a value obtained after frequency domain data is mapped to a corresponding subcarrier;

$$N = N_{RB}^{UL} N_{sc}^{RB},$$

where $N_{RB}^{UL}$ represents a quantity of RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

In another embodiment, optionally, the first processor 61 may be further configured to perform DFT on the synchronization signal, to obtain a converted signal. That the first processor 61 is configured to map the synchronization signal to a subcarrier by means of SC-FDMA, to obtain the baseband signal is specifically: the first processor 61 is configured to map the converted signal to the subcarrier by means of SC-FDMA, to obtain the baseband signal.

That the first processor 61 is configured to perform DFT on the synchronization signal, to obtain a converted signal is specifically: the first processor 61 is configured to obtain the converted signal according to the following formula:

$$b(n) = \frac{1}{\sqrt{L}} \sum_{l=0}^{L-1} d(l) e^{-\frac{2\pi j}{L} l^* n},$$

where l represents an independent variable of the synchronization signal d(l); L is the length of the synchronization signal; b(n) represents the converted signal obtained after DFT is performed on the synchronization signal, where $0 \le n \le L-1$; and j represents an imaginary unit.

In the foregoing embodiment, the first transmitter 62 may be specifically configured to: obtain a radio frequency signal after performing radio frequency conversion on the baseband signal obtained by the first processor; and send out the radio frequency signal when a preset period arrives.

Figure 7:
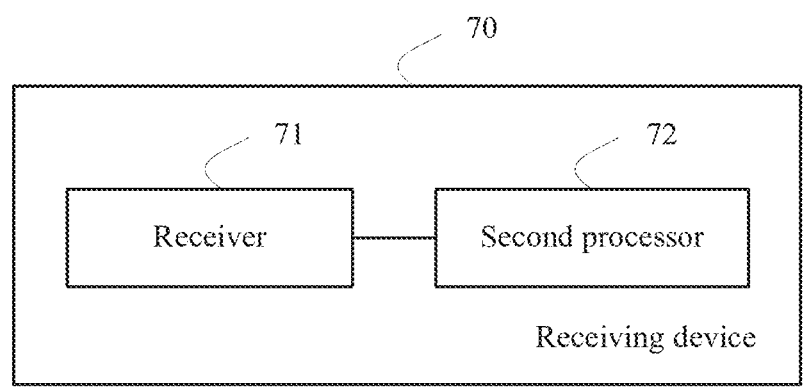
FIG. 7 is a schematic structural diagram of Embodiment 1 of a synchronization signal receiving device according to the embodiments.

FIG. 7 is a schematic structural diagram of Embodiment 1 of a synchronization signal receiving device according to the embodiments. This embodiment provides the synchronization signal receiving device, and the device may be in a signal receiving device such as UE or a base station. As shown in FIG. 7, the synchronization signal receiving device 70 includes a receiver 71 and a second processor 72.

The receiver 71 is configured to receive a synchronization signal, where the synchronization signal is generated by a transmit end according to one or more sequences, and a length or lengths of the one or more sequences are determined according to a length of the synchronization signal. The second processor 72 is configured to detect the synchronization signal received by the receiver 71, to obtain synchronization with the transmit end of the synchronization signal.

The device in this embodiment may be configured to execute a technical solution of a method embodiment shown in FIG. 13, and an implementation principle and a technical effect of the technical solution are similar to those of this embodiment and are not further described herein.

In the foregoing embodiment, the sequence is generated according to an m-sequence, a ZC sequence, or a combination thereof.

Optionally, if the sequence is an m-sequence with a length of 31, a primitive polynomial for generating the one or more sequences is any one or any combination of the following polynomials:

$$x(\bar{i}+5) = (x(\bar{i}+2) + x(\bar{i})) \bmod 2$$

$$x(\bar{i}+5) = (x(\bar{i}+3) + x(\bar{i})) \bmod 2$$

$$x(\bar{i}+5) = (x(\bar{i}+3) + x(\bar{i}+2) + x(\bar{i}+1) + x(\bar{i})) \bmod 2$$

$$x(\bar{i}+5) = (x(\bar{i}+4) + x(\bar{i}+2) + x(\bar{i}+1) + x(\bar{i})) \bmod 2$$

$$x(\bar{i}+5) = (x(\bar{i}+4) + x(\bar{i}+3) + x(\bar{i}+1) + x(\bar{i})) \bmod 2$$

$$x(\bar{i}+5) = (x(\bar{i}+4) + x(\bar{i}+3) + x(\bar{i}+2) + x(\bar{i})) \bmod 2,$$

where $\bar{i}$ is an integer, a value range of $\bar{i}$ is $0 \le \bar{i} \le 25$, and mod 2 represents a modulo operation of division by 2.

Further, if the sequence is an m-sequence with a length of 63, a primitive polynomial for generating the one or more sequences is any one or any combination of the following polynomials:

$$x(\bar{i}+6) = (x(\bar{i}+1) + x(\bar{i})) \bmod 2$$

$$x(\bar{i}+6) = (x(\bar{i}+4) + x(\bar{i}+3) + x(\bar{i}+1) + x(\bar{i})) \bmod 2$$

$$x(\bar{i}+6) = (x(\bar{i}+5) + x(\bar{i})) \bmod 2$$

$$x(\bar{i}+6) = (x(\bar{i}+5) + x(\bar{i}+2) + x(\bar{i}+1) + x(\bar{i})) \bmod 2$$

$$x(\bar{i}+6) = (x(\bar{i}+5) + x(\bar{i}+3) + x(\bar{i}+2) + x(\bar{i})) \bmod 2$$

$$x(\bar{i}+6) = (x(\bar{i}+5) + x(\bar{i}+4) + x(\bar{i}+1) + x(\bar{i})) \bmod 2,$$

where $\bar{i}$ is an integer, a value range of $\bar{i}$ is $0 \le \bar{i} \le 56$, and mod 2 represents a modulo operation of division by 2.

On the foregoing basis, the receiving device 70 may further include a second transmitter. The second processor 72 may be further configured to: detect, according to a preset criterion, whether the receiver 71 receives the synchronization signal; and if the synchronization signal is not detected, trigger the second transmitter to send a synchronization signal generated by the receiving device to another receive end. In this embodiment, the second transmitter may be disposed independently, or may be integrated with the receiver 71, which is not limited in the embodiments.

FIG. 8 is a schematic flowchart of Embodiment 1 of a synchronization signal sending method according to the embodiments. This embodiment the synchronization signal sending method, and the method is used to implement synchronization between a transmit end and a receive end of a synchronization signal, and may be executed by a synchronization signal sending apparatus. The apparatus may be integrated in a signal sending device such as UE or a base station. As shown in FIG. 8, the synchronization signal sending method includes:

S301. Generate a synchronization signal according to one or more sequences, where a length or lengths of the one or more sequences are determined according to a length of the synchronization signal.

Specifically, the sequence includes a first sequence, and S301 is specifically: determining a length or lengths of one or more first sequences according to the length of the synchronization signal; determining a first preset value or first preset values corresponding to the one or more first sequences, where the first preset value corresponding to each first sequence is independent; and performing cyclic shifting on the one or more first sequences according to the first preset value or the first preset values, to generate the synchronization signal.

For different first sequences, there are multiple relationships between first preset values respectively corresponding to the first sequences and an identity (ID for short) of the synchronization signal, and the following describes the relationships one by one:

In a specific implementation manner, the ID of the synchronization signal is determined according to the first preset values corresponding to all the first sequences. That is, all the first preset values are jointly corresponding to the ID of the synchronization signal. For example, theoretically, for an m-sequence with a length of 63, a synchronization signal generated by using two independent m-sequences may be mapped to a maximum of 63*63=3969 IDs, that is, 3969 different synchronization signals are obtained.

In another specific implementation manner, the ID of the synchronization signal is determined according to a PD2DSS identity and the first preset values corresponding to all the first sequences. For example, an m-sequence with a length of 63 may be mapped to 63 IDs, and if there are three different PD2DSS sequences, a total of 3*63=189 IDs of synchronization signals may be mapped to.

In still another specific implementation manner, the ID of the synchronization signal is determined according to any one of the first preset values of all the first sequences. That is, the ID of the synchronization signal can be uniquely determined by any one of the first preset values. A purpose of this is: if a synchronization signal generated at a location of a first preset value is mutually strongly interfered with a synchronization signal sent by an adjacent synchronization source, another first preset value is used for differentiation from a preset value used by the adjacent synchronization source, which ensures that no strong interference occurs between synchronization signals sent by adjacent synchronization sources. In this implementation manner, a sequence with a length of 63 can indicate a maximum of 63 different synchronization signals in a group, and a scrambling sequence may be used for differentiation between different groups.

In yet another specific implementation manner, the ID of the synchronization signal is determined according to a PD2DSS identity and any one of the first preset values of all the first sequences. That is, the ID of the synchronization signal may be represented by Nid=f(x, PD2DSS identity), where Nid represents the ID of the synchronization signal, x represents a first preset value, f represents a function of content (the first preset value and the PD2DSS identity) in brackets. For example, Nid=x mod $N_{max}$, or Nid=(x+ PD2DSS identity) mod $N_{max}$, where $N_{max}$ represents a maximum quantity of different synchronization sources, for example, $N_{max}$=100 or 60, where this parameter may be predefined in a protocol, or may be indicated by means of signaling; and mod represents a modulo operation.

In this step, the sequence may be generated according to an m-sequence, a ZC sequence, or a combination thereof. That is, the synchronization signal is generated according to the m-sequence, or the synchronization signal is generated according to the ZC sequence, or the synchronization signal is generated according to both the m-sequence and the ZC sequence.

Both the m-sequence and the ZC (Zadoff-Chu) sequence are specific sequences with excellent related performance. A difference between the two sequences in terms of correlation is: in periodic autocorrelation of the m-sequence, correlation values corresponding to all cyclic shift values are −1 except a main peak, and a maximum cross-correlation value of an m-sequence scrambled by using another m-sequence is approximately $\sqrt{Q}+1$, where Q is a sequence length; in periodic autocorrelation of the ZC sequence, correlation values corresponding to all cyclic shift values are o except a main peak, and a smallest cross-correlation value of a ZC sequence scrambled by using another ZC sequence may be $\sqrt{Q}$.

A ZC sequence whose sequence length Q is an odd number is generated according to the following formula:

$$d(n) = e^{-j\frac{\pi u n(n+1)}{Q}}, n = 0, 1, \ldots, Q-1 \quad \text{Formula (1a)}$$

or $$d(n) = e^{j\frac{\pi u n(n+1)}{Q}}, n = 0, 1, \ldots, Q-1, \quad \text{Formula (1b)}$$

where j represents an imaginary unit; u is a root sequence number of the ZC sequence, which is an integer that is coprime to the sequence length Q; and d(n) represents a specific value of an index n corresponding to each chip in the ZC sequence.

A ZC sequence whose sequence length Q is an even number is generated according to the following formula:

$$d(n) = e^{-j\frac{\pi u n^2}{Q}}, n = 0, 1, \ldots, Q-1 \quad \text{Formula (2a)}$$

or $$d(n) = e^{j\frac{\pi u n^2}{Q}}, n = 0, 1, \ldots, Q-1, \quad \text{Formula (2b)}$$

where j represents an imaginary unit; u is a root sequence number of the ZC sequence, which is an integer that is coprime to the sequence length Q; and d(n) represents a specific value of an index n corresponding to each chip in the ZC sequence.

For a ZC sequence with a specific sequence length value Q, a different root sequence number u is corresponding to a different ZC sequence.

The m-sequence is a sequence that has a longest period and that can be generated by an m-stage shift register. A length of the m-sequence is $2^m-1$, that is, the length of the m-sequence may be 7, 15, 31, 63, 127, 255, or the like. The m-sequence is a binary sequence.

A quantity of sequences for generating the synchronization signal depends on a length of a sequence that can be used by the synchronization signal. One or more sequences with a length are determined according to the length of the synchronization signal, to generate the synchronization signal. For example, the length of the synchronization signal does not exceed 72, and if an m-sequence is used, a preferable length of the sequence is 62 or 63. When the length of the synchronization signal is 62, it is determined that the synchronization signal with a length of 62 may be generated by using two m-sequences with a length of 31; or when the length of the synchronization signal is 63, it is determined that the synchronization signal with the length of 63 may be generated by using one m-sequence with a length of 63. Other similar cases are not listed herein one by one.

S302. Obtain a baseband signal according to the synchronization signal.

Specifically, S302 may include: mapping the synchronization signal to a subcarrier, to obtain a frequency domain signal; and obtaining a time domain signal according to the frequency domain signal.

The mapping the synchronization signal to a subcarrier, to obtain a frequency domain signal may be specifically: separately mapping all sequences included in the synchronization signal to the subcarrier, to obtain a frequency domain subcarrier signal corresponding to all the sequences, and further obtain the frequency domain signal, where the frequency domain signal includes the frequency domain subcarrier signal. For example, two sequences with a length of 31 may be respectively mapped to odd and even subcarriers, or may separately occupy 31 consecutive subcarriers, or may be mapped to total 62 subcarriers in one-to-one correspondence in another manner. For a sequence with a length of 63, a method for mapping the sequence to 63 subcarriers is similar to that in the foregoing example. The sequence with the length of 63 may be mapped to 63 consecutive subcarriers, or may be mapped to the 63 subcarriers in one-to-one correspondence by using any other method.

In an actual application scenario, a person skilled in the art may understand that the obtaining a time domain signal according to the frequency domain signal is: modulating the frequency domain signal to the time domain signal. A modulation scheme may be orthogonal frequency division multiplexing (OFDM), or may be single carrier frequency division multiple access (SC-FDMA), and a specific modulation scheme is described in detail in the following embodiment.

S303. Send out the baseband signal after performing radio frequency conversion.

Specifically, S303 may include: obtaining a radio frequency signal after performing radio frequency conversion on the baseband signal; and sending out the radio frequency signal, for example, to a receiver when a preset period arrives.

In a D2D communication scenario, a value of cross-correlation between synchronization signals provided in this embodiment is small, which can reduce synchronization detection time. Therefore, a receive end of the synchronization signals can implement quick synchronization with a transmit end according to the synchronization signals, thereby improving system performance.

It should be noted that, in any embodiment, a synchronization source group may include multiple synchronization sources. The synchronization source is a device that sends a synchronization signal, that is, a transmission source of the synchronization signal or a transmitter of the synchronization signal. In a D2D communication process, a transmit end and a receive end are disposed relatively. A receive end may also serve as a transmit end (that is, a synchronization source), and send a synchronization signal generated by the receive end to another receive end, so as to implement synchronization between devices. In addition, a group identity in this embodiment is an identity of the foregoing synchronization source group.

Based on the foregoing embodiment, the sequence may further include a second sequence, and S301 may further include: generating a scrambling sequence according to one or more second sequences, and performing scrambling processing at least one time on the synchronization signal by using the scrambling sequence. S302 is specifically: obtaining the baseband signal according to the synchronization signal undergoing the scrambling processing. As shown in Table 1, the first sequence and the second sequence may be generated according to an m-sequence, a ZC sequence, or a combination of an m-sequence and a ZC sequence. In this embodiment, a peak-to-average ratio of the synchronization signal can be reduced by using the foregoing scrambling sequence.

TABLE 1

| First sequence | Second sequence |
|---|---|
| m-sequence | m-sequence |
| m-sequence | ZC sequence |
| ZC sequence | m-sequence |
| ZC sequence | ZC sequence |

Optionally, the generating a scrambling sequence according to one or more second sequences may specifically include: determining a length or lengths of the one or more second sequences according to the length of the synchronization signal; determining a second preset value or second preset values corresponding to the one or more second sequences, where all second sequences are corresponding to one second preset value or different second preset values, and second preset values of scrambling sequences corresponding to all synchronization sources in a group are the same; and performing cyclic shifting on each second sequence according to the second preset value, to generate the scrambling sequence. In this embodiment, a cyclic shift value (that is, a second preset value) corresponding to the scrambling sequence is obtained according to the group identity. In a D2D group, scrambling sequences used for different synchronization signals have one cyclic shift, so as to improve related performance between synchronization signals in the group, and provide scalability for configuration of inter-group synchronization signals. Further, when there are multiple scrambling sequences, at least one scrambling sequence is corresponding to one second preset value in the group, and the other scrambling sequences are corresponding to different second preset values. In addition, cyclic shift values (second preset values) of scrambling sequences in different D2D groups may be indicated in an explicit or implicit manner.

It should be noted that either the first preset value or the second preset value is determined according to the group identity. For ease of description, the first preset value and the second preset value are collectively referred to as a preset value.

Determining the preset value according to the group identity may be specifically: determining the preset value according to the following formula:

$$f(N_{GID}) = a * N_{GID} + b \quad \text{Formula (3a)}$$

or $$f(N_{GID}) = (a * N_{GID} + b) \bmod K \quad \text{Formula (3b),}$$

where $N_{GID}$ represents the group identity; a and b are predefined constants; $f(N_{GID})$ represents the preset value; K is a constant defined by a system, for example, K may be a maximum quantity, indicated by the system, of synchronization signals in a group; and mod represents a modulo operation.

It should be noted that the group identity may be a function of a PD2SS identity, or may be carried in a first control instruction delivered by a network, or may be carried in a second control instruction delivered by a transmit device, or may be implicitly indicated by a network.

Specifically, in a D2D scenario with network coverage, the first control instruction may be sent to a D2D synchronization signal transmit end by using the network. The first control instruction carries the group identity. Optionally, the group identity may be carried in the first control instruction delivered by the network. For example, in an LTE system, the first control instruction may be downlink control information (DCI for short) or radio resource control (RRC for short) signaling that is sent by an evolved NodeB (eNB) in the downlink by using a cellular link. If the network configures one group identity for different D2D synchronization signal transmit ends, the D2D synchronization signal transmit ends belong to one group. If the network configures different group identities for different D2D synchronization signal transmit ends, the D2D synchronization signal transmit ends belong to different groups. Optionally, the group identity may be an identity carried in scheduling assignment (SA for short) control signaling used in D2D, so as to instruct UE that receives the SA signaling to generate a group identity of a synchronization signal.

In addition, if a PD2DSS exists, D2D synchronization signal transmit ends that use a D2DSS belong to a group, that is, the group identity $N_{GID}$ may be the function of the PD2DSS identity. This method may be applied to both a scenario with network coverage and a scenario without network coverage.

In a scenario without network coverage, the second control instruction may also be sent to the D2D synchronization signal transmit end by using the transmit device, where the second control instruction carries at least the group identity $N_{GID}$ of the synchronization signal, and a function of the transmit device is similar to a function of the evolved NodeB (eNB) in the scenario with network coverage, but an entity of the transmit device may be a control device or D2D UE with a higher capability.

The implicitly indicating by a network means that, in a case in which there is network coverage, the group identity may be indicated by various information delivered by the network, where the information is sent by the network to UE served by the network. For example, if there is network coverage, D2D UE within a network service range is synchronized with a base station 10. As shown in FIG. 1, UE 11, UE 12, and UE 13 are synchronized with the base station 10 according to a downlink synchronization signal (a primary synchronization signal (PSS) and a secondary synchronization signal (SSS)) delivered by the base station 10. In addition, for example, the UE 13, as a synchronization source, sends out a synchronization signal D2DSS generated by the UE 13, but the UE 13 still sends the generated D2DSS on a basis of synchronization between the UE 13 and the base station 10. That is, in a case in which there is network coverage, the base station 10 is used as a synchronization reference source for synchronization reference of all D2D UE synchronization sources, and therefore it can be considered that D2DSSs sent by the D2D UE synchronization sources use a synchronized (or same) synchronization reference source. The "same" indicates that all D2D UEs use one serving base station as a synchronization reference, and the "synchronized" indicates that all D2D UEs may use multiple base stations as synchronization references, but the multiple base stations are synchronized.

In a case in which there is network coverage, synchronization sources of D2DSSs that use a synchronization reference source in a serving cell may be classified into one group, and use a group identity in a D2DSS generation process. A specific implementation method is as follows: when there is network coverage, all D2D UEs that use a base station (or multiple synchronized base stations) as a synchronization reference use, when sending a D2DSS, information about the synchronization reference source base station to obtain a group identity. For example, a part or all of information about a cell identity (Physical Cell Identify (PCI)) of the base station is used to generate the group identity.

A cyclic shift (the second preset value) of a scrambling sequence used by D2D UE in a group may be generated by using the following identities:

Manner 1: a group identity is generated according to $N_{ID}^{cell}$, where $N_{ID}^{cell}$ is a cell identity of a base station;

Manner 2: a group identity is generated according to $N_{ID}^{(2)}$, where $N_{ID}^{(2)}$ is an identity corresponding to a PSS of an LTE base station, and a value of $N_{ID}^{(2)}$ may be 0, 1, or 2;

Manner 3: a group identity is generated according to $N_{ID}^{(1)}$, where $N_{ID}^{(1)}$ is an identity corresponding to an SSS of an LTE base station, and a value of $N_{ID}^{(1)}$ may be at least from 0 to 167, or may include a value greater than 167.

A method for generating the second preset value according to the foregoing identities may be random mapping from the foregoing identities to the second preset value, that is, one unique second preset value can be generated from one of the foregoing identities. For example, the second preset value may be equal to one of the foregoing identities, or the second preset value may be linear function mapping of the foregoing identities, which is not limited herein.

Based on the foregoing embodiment, the synchronization signal may include at least one first synchronization signal and at least one second synchronization signal, and first sequences corresponding to all first synchronization signals and all second synchronization signals are the same or different; and the mapping the synchronization signal to a subcarrier, to obtain a frequency domain signal may include: respectively mapping all the first synchronization signals to first locations corresponding to all the first synchronization signals, and respectively mapping all the second synchronization signals to second locations corresponding to all the second synchronization signals, to obtain the frequency domain signal, where the first locations corresponding to all the first synchronization signals and the second locations corresponding to all the second synchronization signals are respectively different symbol locations in one subframe, or the first locations corresponding to all the first synchronization signals and the second locations corresponding to all the second synchronization signals are respectively in different subframes.

Still further, the synchronization signal may further include at least one third synchronization signal, and a sequence corresponding to the third synchronization signal is the same as or different from a sequence corresponding to the first synchronization signal or the second synchronization signal. The mapping the synchronization signal to a subcarrier, to obtain a frequency domain signal may further include: respectively mapping all third synchronization signals to third locations corresponding to all the third synchronization signals, to obtain the frequency domain signal, where the third locations corresponding to all the third synchronization signals, the first locations corresponding to all the first synchronization signals, and the second locations corresponding to all the second synchronization signals are respectively different symbol locations in one subframe, or the first locations corresponding to all the first synchronization signals, the second locations corresponding to all the second synchronization signals, and the third locations corresponding to all the third synchronization signals are respectively in different subframes.

In the following description, the foregoing embodiment is further described by using different application scenarios.

In an actual application of this embodiment, if the foregoing sequence is an m-sequence with a length of 31, a primitive polynomial of the foregoing one or more sequences is any one or any combination of the following polynomials:

$$x(\bar{i}+5)=(x(\bar{i}+2)+x(\bar{i}))\bmod 2$$

$$x(\bar{i}+5)=(x(\bar{i}+3)+x(\bar{i}))\bmod 2$$

$$x(\bar{i}+5)=(x(\bar{i}+3)+x(\bar{i}+2)+x(\bar{i}+1)+x(\bar{i}))\bmod 2$$

$$x(\bar{i}+5)=(x(\bar{i}+4)+x(\bar{i}+2)+x(\bar{i}+1)+x(\bar{i}))\bmod 2$$

$$x(\bar{i}+5)=(x(\bar{i}+4)+x(\bar{i}+3)+x(\bar{i}+1)+x(\bar{i}))\bmod 2$$

$$x(\bar{i}+5)=(x(\bar{i}+4)+x(\bar{i}+3)+x(\bar{i}+2)+x(\bar{i}))\bmod 2 \quad \text{Formula (4),}$$

where $\bar{i}$ is an integer, a value range of $\bar{i}$ is $0 \leq \bar{i} \leq 25$, and mod 2 represents a modulo operation of division by 2. In formula (4), any primitive polynomial is a sequence represented by 0 and 1.

An example is given herein for description, and a secondary D2D synchronization signal (SD2DSS) is used as an example to describe generation of a synchronization signal. It is assumed that a length of the SD2DSS is 62, the SD2DSS may be generated according to two m-sequences (that is, first sequences) with a length of 31, and the two m-sequences with the length of 31 are respectively represented by $s_0$ and $s_1$, the SD2DSS is corresponding to two parts: $d_A$ and $d_B$, where relationships between $d_A$ and $s_0$, $s_1$, and between $d_B$ and $s_0$, $s_1$ are separately shown in the following formulas:

$$d_A(n) = s_A(n) \quad \text{Formula (5)}$$
$$d_B(n) = s_B(n)$$

$$s_A(n) = \begin{cases} s_0^{(m_0)}(n) & \text{First location} \\ s_1^{(m_1)}(n) & \text{Second location} \end{cases}$$

$$s_B(n) = \begin{cases} s_1^{(m_1)}(n) & \text{First location} \\ s_0^{(m_0)}(n) & \text{Second location} \end{cases},$$

where $s_0^{(m_0)}$ is obtained after a left cyclic shift of $m_0$ is performed on $\tilde{s}_0$, and $s_1^{(m_1)}$ is obtained after a left cyclic shift of $m_1$ is performed on $\tilde{s}_1$.

$$s_0^{(m_0)}(n) = \tilde{s}_0((n+m_0) \bmod 31)$$

$$s_1^{(m_1)}(n) = \tilde{s}_1((n+m_1) \bmod 31) \quad \text{Formula (6),}$$

where $\tilde{s}_0$ and $\tilde{s}_1$ are m-sequences with a length of 31, where the two m-sequences may be the same or may be different, and $$\tilde{s}_k(i) = 1 - 2x_k(i), 0 \leq i \leq 30, k=0,1; \text{ and}$$

a primitive polynomial $x_k$ for generating $\tilde{s}_0$ and $\tilde{s}_1$ may be any one or two of the primitive polynomials in formula (4). In any primitive polynomial in formula (4), initial values may be set as follows:

$$x(0)=0, x(1)=0, x(2)=0, x(3)=0,$$

and $x(4)=1$. It should be noted herein that the initial values only need to include a non-zero value (that is, 1). For example, the initial values may also be set as follows: $x(0)=1$, $x(1)=0$, $x(2)=0$, $x(3)=0$, and $x(4)=0$. In addition, sequences represented by 0 and 1 may be mapped to sequences represented by +1 and −1 according to the formula:

$$\tilde{s}_k(i) = 1 - 2x_k(i),$$

where the sequences represented by +1 and −1 are respectively the first sequence and the second sequence in this embodiment.

Figure 9:
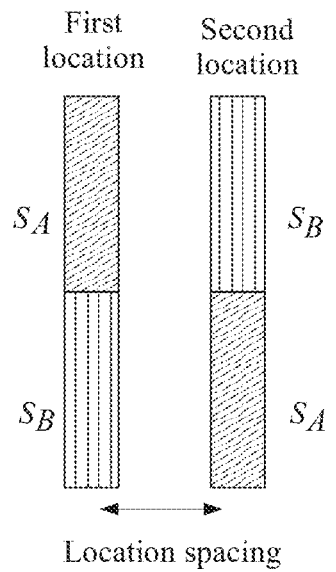
FIG. 9 is an exemplary diagram of an secondary D2D synchronization signal (SD2DSS) in Embodiment 2 of a synchronization signal sending method according to the embodiments.

FIG. 9 is an exemplary diagram of an SD2DSS in Embodiment 2 of a synchronization signal sending method according to the embodiments. As shown in FIG. 9, the SD2DSS is a signal that includes sequences in at least two locations that are separated by a small location spacing, and locations of first sequences $s_A$ and $s_B$ are exchanged at a first location and a second location, where the location spacing may be a different symbol location in one subframe (1 ms), or may be a spacing of several subframes. Optionally, a sending period of the SD2DSS is relatively long, and is generally more than 100 milliseconds (ms) such as 2.56 seconds (s), which is equivalent to 256 radio frames. In this embodiment, the SD2DSS is periodically sent in a relatively long period, so as to increase a probability that a receive end receives the SD2DSS sent by a synchronization source.

It should be additionally noted that, FIG. 9 is merely an exemplary diagram of the SD2DSS, and locations of $s_A$ and $s_B$ after being mapped to a frequency domain subcarrier may be consecutively and adjacently arranged as shown in FIG. 9; or may be alternately arranged according to odd and even subcarriers; or may be arranged by using another method. It should be ensured that, two sequences $s_A$ and $s_B$ with a length of 31 are corresponding to different locations of 62 locations in total, and two locations corresponding to $s_A$ and $s_B$, that is, a first SD2DSS location and a second SD2DSS location shown in FIG. 9, may be exchanged.

Further, scrambling may be performed on the foregoing synchronization signal by using a scrambling sequence, that is:

$$d_A(n) = s_A(n)c_0(n)$$

$$d_B(n) = s_B(n)c_1(n) \quad \text{Formula (7).}$$

In the foregoing formula, $c_0$ and $c_1$ are generated according to an m-sequence with a length of 31, and a primitive polynomial corresponding to the m-sequence with the length of 31 is any one or two of the primitive polynomials in formula (4).

It should be highlighted that the foregoing scrambling sequence $c_0$ is obtained after cyclic shifting about a group identity is performed on $\tilde{c}_0$, and the scrambling sequence $c_1$ is obtained after cyclic shifting about a group identity is performed on $\tilde{c}_1$, where specifically:

$$c_0(n) = \tilde{c}_0((n+f_1(N_{GID})) \bmod 31)$$

$$c_1(n) = \tilde{c}_1((n+f_2(N_{GID})) \bmod 31) \quad \text{Formula (8).}$$

In formula (8), $N_{GID}$ represents the group identity, and a specific value of the group identity is indicated in an explicit or implicit manner in a group, where an indication method is described in more detail in the following embodiment. $f_k(N_{GID})$ is a function of $N_{GID}$, and may be formula (3a) or formula (3b). For example, in one embodiment, $f_k(N_{GID})=N_{GID}$, and in another embodiment, $f(N_{GID})=N_{GID}$ mod K, where K may represent a maximum quantity of synchronization sources in a group, or a maximum quantity of forwarding times that can be supported by a synchronization source, and $f_1(N_{GID})$ may be the same as or may be different from $f_2(N_{GID})$.

Still further, a part of the synchronization signal generated according to formula (7) may be re-scrambled, that is:

$$d_A(n)=s_A(n)c_0(n)$$

$$d_B(n)=s_B(n)c_1(n)z_1(n) \quad \text{Formula (9)}.$$

In formula (9), $z_1$ is generated according to an m-sequence with a length of 31, and the m-sequence with a length of 31 is specifically represented as $\tilde{z}_1$, where $\tilde{z}_1$ may also be any primitive polynomial in formula (4). $z_1$ is obtained after cyclic shifting about a group identity function is performed on $\tilde{z}_1$, which is shown in formula (10):

$$z_1(n)=\tilde{z}_1((n+g(N_{GID}))\bmod 31) \quad \text{Formula (10)}.$$

In formula (10), $g(N_{GID})$ is a function of $N_{GID}$, and may be formula (3a) or formula (3b). For example, in one embodiment, $g(N_{GID})=N_{GID}$ and in another embodiment, $f(N_{GID})=N_{GID}$ mod K, where K may represent a quantity of synchronization sources in a group, or a maximum quantity of forwarding times that a synchronization source can support. A peak-to-average ratio (Peak to Average Power Ratio, PAPR for short) of a sent synchronization signal can further be reduced by means of re-scrambling by using the scrambling sequence obtained according to formula (10).

In a more specific special example, the synchronization signal in this embodiment is obtained according to the following formula:

$$d(2n) = \begin{cases} s_0^{(m_0)}(n)c_0(n) & \text{First location} \\ s_1^{(m_1)}(n)c_0(n) & \text{Second location} \end{cases} \quad \text{Formula (11a)}$$

$$d(2n+1) = \begin{cases} s_1^{(m_1)}(n)c_1(n)z_1(n) & \text{First location} \\ s_0^{(m_0)}(n)c_1(n)z_1(n) & \text{Second location} \end{cases}$$

or $$d(2n) = \begin{cases} s_0^{(m_0)}(n)c_0(n) & \text{First location} \\ s_1^{(m_1)}(n)c_0(n) & \text{Second location} \end{cases} \quad \text{Formula (11b)}$$

$$d(2n+1) = \begin{cases} s_1^{(m_1)}(n)c_1(n)z_1^{(m_0)}(n) & \text{First location} \\ s_0^{(m_0)}(n)c_1(n)z_1^{(m_1)}(n) & \text{Second location} \end{cases}.$$

It can be learned from formula (11a) that, in an application scenario in which there are multiple groups, when all synchronization sources in each group send an SD2DSS, a group identity $N_{GID}$ is used to generate the SD2DSS. When new UE is to send an SD2DSS generated by the UE, to serve as a synchronization source, the UE first needs to obtain $N_{GID}$ information indicated in a group to which the UE belongs, and then generates the SD2DSS by using $N_{GID}$ same as that used in the group.

In formula (11b), an SD2DSS signal determined according to the synchronization signal is generated by using two sequences, a part of the SD2DSS signal is placed at an even-numbered sequence location d(2n) after being generated, and the other part of the SD2DSS signal is placed at an odd-numbered sequence location d(2n+1) after being generated. Formula (11b) is merely an embodiment; after being generated, the two sequences may also be mapped to sequence locations in another manner, so as to generate the SD2DSS.

In formula (11b), scrambling processing is performed on d(2n) by using $c_0(n)$, and $c_0(n)$ has a cyclic shift (second preset value) in a group. Therefore, a cross-correlation value of normalized $c_0(n)$ is −1, thereby implementing quick synchronization between a receive end and a transmit end of the synchronization signal. In addition, scrambling processing is performed on d(2n+1) by using:

$$c_1(n))z_1^{(m_0)}(n) \text{ and}$$

$$c_1(n)z_1^{(m_1)}(n),$$

to implement effective cross detection between $m_0$ and $m_1$, where $c_1(n)$ has a cyclic shift (second preset value) in the group, and $z_1^{(m_0)}(n)$ and $z_1^{(m_1)}(n)$ are correspondingly generated by cyclic shifting with different second preset value, $m_0$ and $m_1$ respectively, are performed on $z_1(n)$. For example, when a signal of d(2n) at a first location is interfered, $m_0$ cannot be detected (that is, a specific value of $m_0$ cannot be obtained); in this scenario, a signal of d(2n) at a second location is not interfered, that is, $m_1$ can be detected by using the signal of d(2n) at the second location. After $m_1$ is detected, a value of $m_1$ is substituted into a first location of d(2n+1), and then $m_0$ can be detected (because $m_0$ at the second location is configured in $z_1^{(m_0)}(n)$, there is a small probability that $m_0$ is interfered), thereby avoiding a case in which some cyclic shift values cannot be detected in some interference scenarios.

Figure 10:
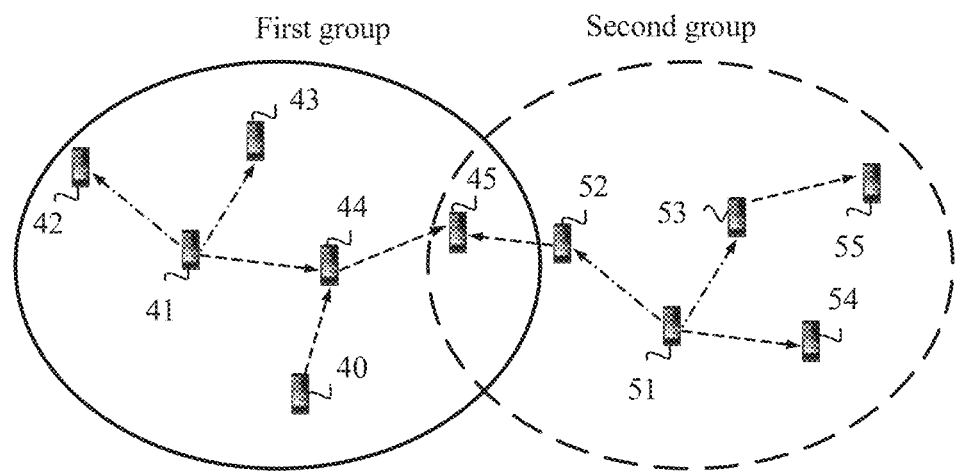
FIG. 10 is a schematic diagram of a communication scenario in Embodiment 3 of a synchronization signal sending method according to the embodiments.

For example, as shown in FIG. 10, in a first group, UE 41 is a first-level synchronization source, and the UE 41 generates an SD2DSS in a manner of $N_{GID}$=0; UE 42 and UE 43 join the first group, and listen to the SD2DSS sent by the UE 41, so as to implement synchronization with the UE 41. Likewise, UE 40 is another independent first-level synchronization source, and before sending an SD2DSS, the UE 40 first obtains group identity information of the first group, and then also generates its own SD2DSS in a manner of $N_{GID}$=0. UE 44 is a second-level synchronization source, and after receiving the two synchronization signals sent by both the UE 41 and the UE 40, the UE 44 is synchronized with any one or more synchronization sources according to a preset policy (for example, selecting one with highest signal power for synchronization, or selecting weighted locations of synchronization locations of the two for synchronization). A sending process of an SD2DSS in a second group on the right side of FIG. 10 is similar to that in the first group, and there is only one independent first-level synchronization source UE 51 and two second-level synchronization sources UE 52 and UE 53 in the second group. UE 45 located between the two groups can receive synchronization signals from both the first group and the second group. The UE 45 may choose to join a specific group on its own according to a behavior of the UE. For example, the UE 45 may determine, according to interest of the UE 45 in content sent by the first group and the second group, to join which group.

In addition, in the first group, although all of the UE 40, the UE 41, and the UE 44 send SD2DSSs, and use a group identity, the SD2DSSs respectively sent by the UE 40, the UE 41, and the UE 44 may be different. In this way, UE synchronized with the UE 40, the UE 41, and the UE 44 distinguishes received synchronization signals. Signal generation of an SD2DSS may be any one of formula (5), formula (7), or formula (9), and a first sequence corresponding to the SD2DSS may be generated by using different cyclic shifts.

Because cyclic shift values (that is, second preset values) of scrambling sequences are the same in each group, cross correlation between synchronization signals in the group is equal to cross correlation of a first sequence after cyclic shifting is performed. The first sequence is an m-sequence, and a correlation value between sequences obtained after different periodic cyclic shifts are performed on the m-sequence is −1 and is unrelated to a length of the sequence. Therefore, in one group, a cross correlation value between SD2DSSs generated by different synchronization sources according to the foregoing method is −1.

That is, in the first group, a cross correlation value of sequences corresponding to three SD2DSSs sent by the UE 40, the UE 41, and the UE 44 is −1. Likewise, in the second group, a cross correlation value of sequences corresponding to three SD2DSSs sent by the UE 51, the UE 52, and the UE 53 is −1. Therefore, the embodiments can greatly reduce cross correlation between SD2DSSs in a group, and improve synchronization detection performance.

It should be additionally noted that a quantity of synchronization sources in a D2D group is generally limited, and generally, dozens of synchronization sources, or even only several or a dozen synchronization sources exist. In addition, in FIG. 10, the UE 45 on the edge of the two groups can receive SD2DSSs sent by both the UE 44 and the UE 52. The two synchronization signals are from two different groups, and cross correlation between the two synchronization signals may be relatively poor, which is determined by an overlapping area of the two groups in which the UE 45 is located.

As an important step of the embodiments, the following describes establishment and identification of a D2D synchronization source group.

Method 1: PD2DSSs used in one group are the same, and a group identity is distinguished according to a PD2DSS. For example, a PD2DSS uses a primary synchronization signal (Primary Synchronization Signal, PSS for short) in LTE, and there are three different PD2DSS signals in total (as shown in Table 2), where a group identity is represented by using $N_{ID}^{(2)}$ in LTE. Therefore, UE that is in a D2D synchronization source group and that is to transmit a synchronization signal only needs to detect a PD2DSS in a D2DSS sent by another D2D synchronization source, and then the UE can determine which group the UE is closest to. Then, when sending an SD2DSS, new UE (for example, the UE 40 in FIG. 10) sends the SD2DSS according to a group identity of this group. This method is an implicit indication method, and this method is applicable to both a scenario with network coverage and a scenario without network coverage.

Method 2: When there is network coverage, a base station, for example, an eNB, indicates, in a cellular link by using signaling (DCI or RRC) to a transmitter of a D2D synchronization source belongs, a group identity of a group to which the transmitter of the D2D synchronization source. The second method is an explicit indication method.

Method 3: When there is no network coverage, information about a group identity of a group to which a transmitter of a D2D synchronization source belongs is indicated to the transmitter of the D2D synchronization source by using a control device or D2D UE with a higher capability level. In this case, the control device or the D2D UE with the higher capability provides a function of coordinating synchronization source group in distributed network. The third method is an explicit indication method.

A group identity of a synchronization source group may be directly or indirectly indicated to a D2D receiver. An indication method may be: indirectly indicating by using a D2DSS identity, or indicating by using control signaling sent by a D2D transmitter to a D2D receiver.

TABLE 2

| $N_{ID}^{(2)}$ | Root sequence number u of a PSS |
|---|---|
| 0 | 25 |
| 1 | 29 |
| 2 | 34 |

In another actual application of this embodiment, if the foregoing sequence is an m-sequence with a length of 63, a primitive polynomial of the foregoing one or more sequences is any one or any combination of the following polynomials:

$$x(\bar{i}+6)=(x(\bar{i}+1)+x(\bar{i}))\bmod 2$$

$$x(\bar{i}+6)=(x(\bar{i}+4)+x(\bar{i}+3)+x(\bar{i}+1)+x(\bar{i}))\bmod 2$$

$$x(\bar{i}+6)=(x(\bar{i}+5)+x(\bar{i}))\bmod 2$$

$$x(\bar{i}+6)=(x(\bar{i}+5)+x(\bar{i}+2)+x(\bar{i}+1)+x(\bar{i}))\bmod 2$$

$$x(\bar{i}+6)=(x(\bar{i}+5)+x(\bar{i}+3)+x(\bar{i}+2)+x(\bar{i}))\bmod 2$$

$$x(\bar{i}+6)=(x(\bar{i}+5)+x(\bar{i}+4)+x(\bar{i}+1)+x(\bar{i}))\bmod 2 \qquad \text{Formula (12)},$$

where $\bar{i}$ is an integer, a value range of $\bar{i}$ is $0 \leq \bar{i} \leq 56$, and mod 2 represents a modulo operation of division by 2. In any primitive polynomial in formula (12), initial values may be set as follows: $x(0)=0$, $x(1)=0$, $x(2)=0$, $x(3)=0$, $x(4)=0$, and $x(5)=1$. It should be noted herein that the initial values only need to include a non-zero value (that is, 1). For example, the initial values may also be set as follows: $x(0)=1$, $x(1)=0$, $x(2)=0$, $x(3)=0$, $x(4)=0$, and $x(5)=1$.

In this application scenario, generation of an SD2DSS is still used as an example for description. It is assumed that a length of the SD2DSS is 63, the SD2DSS may be generated according to an m-sequence (that is, a first sequence) with a length of 63, and the SD2DSS is represented by d; then:

$$d(n)=s_0^{(m_0)}(n), 0 \leq n \leq 62 \qquad \text{Formula (13a)}.$$

Based on formula (13a), further, a synchronization signal independently configured at another location is added, combination of the two signals may increase a total quantity of synchronization source identities indicated by the entire synchronization signal.

$$d(n) = \begin{cases} s_0^{(m_0)}(n) & \text{First location} \\ s_1^{(m_1)}(n) & \text{Second location} \end{cases}, 0 \leq n \leq 62. \qquad \text{Formula (13b)}$$

In formula (13a) and formula (13b), generation manners of $s_0^{(m_0)}$ and $s_1^{(m_1)}$ are the same as those in the previous application scenario, and differences between the two application scenarios are a length of a synchronization signal and a primitive polynomial used for generating the synchronization signal. A primitive polynomial in this application scenario may be any one or more primitive polynomials in formula (12). Two sequences with a length of 63 are respectively at a first location and a second location, and the two sequences may be the same or may be different; and cyclic shift values (that is, first preset values) corresponding to the two sequences are independently configured.

Optionally, the synchronization signals generated according to formula (13a) and formula (13b) are scrambled, as shown in formula (14a) and formula (14b):

$$d(n) = s_0^{(m_0)}(n)c_0(n), 0 \le n \le 62 \qquad \text{Formula (14a)}$$

$$d(n) = \begin{cases} s_0^{(m_0)}(n)c_0(n) & \text{First location} \\ s_1^{(m_1)}(n)c_1(n) & \text{Second location} \end{cases}, 0 \le n \le 62. \qquad \text{Formula (14b)}$$

In formula (14a) and formula (14b), generation manners of $c_0$ and $c_1$ are the same as those in the previous application scenario. Based on formula (13a) and formula (13b), $c_0$ and $c_1$ are scrambling sequences used for generating the SD2DSS. Cyclic shifting is performed on the scrambling sequences according to a group identity. Details are not further described herein.

Further, the synchronization signal generated according to formula (14b) is re-scrambled:

$$d(n) = \begin{cases} s_0^{(m_0)}(n)c_0(n) & \text{First location} \\ s_1^{(m_1)}(n)c_1(n) & \text{Second location} \\ s_2^{(m_2)}(n)c_2(n)z_1^{(m_3)} & \text{Third location} \end{cases} \qquad \text{Formula (15)}$$

Figure 11:
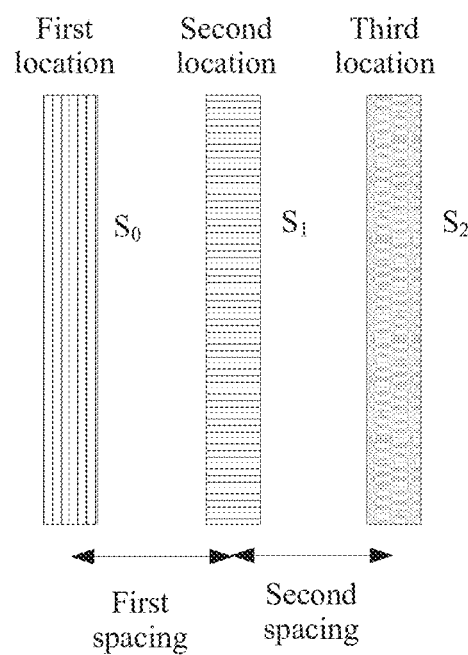
FIG. 11 is an exemplary diagram of an SD2DSS in Embodiment 4 of a synchronization signal sending method according to the embodiments.

An exemplary diagram of a synchronization signal generated according to formula (15) is shown in FIG. 11. A spacing between a first location and a second location is a first spacing, and a spacing between the second location and a third location is a second spacing; Sizes of the two spacings are the same or different, which is not limited herein. Specific values of the two spacings may be set according to an actual requirement. $s_2$ in this formula may be either $s_0$ or $s_1$, or may be obtained according to $s_0$ and $s_1$, or may be different from $s_0$ and $s_1$. $c_2$ may be either $c_0$ or $c_1$, or may be obtained according to $c_0$ and $c_1$, or may be different from $c_0$ and $c_1$. Values of $m_2$ and $m_3$ are obtained according to $m_0$ and $m_1$, and $m_2$ is not equal to $m_3$. That is, the values of $m_2$ and $m_3$ may be as follows: $m_2=m_0$ and $m_3=m_1$; or $m_2=m_1$ and $m_3=m_0$. In this embodiment, an identity of the synchronization signal SD2DSS is jointly indicated by $m_0$ and $m_1$, and $m_0$ and $m_1$ can indicate a wider identity range for the SD2DSS. In addition, a method for re-scrambling or scrambling more times formula (14a) is similar to that in the foregoing description, and details are not further described herein.

The foregoing describes in detail a synchronization signal generation method provided in this embodiment by using two actual applications, but the embodiments are not limited to the foregoing two scenarios. Synchronization signal generation methods in different scenarios are similar, and details are not further described herein.

In the foregoing embodiment, the obtaining a time domain signal according to the frequency domain signal may include: obtaining the baseband signal from the frequency domain signal by means of OFDM, or obtaining the baseband signal from the frequency domain signal by means of SC-FDMA.

In an embodiment for obtaining the baseband signal, the obtaining the baseband signal from the frequency domain signal by means of OFDM may include obtaining the baseband signal according to the following formula:

$$s(t) = \sum_{k=-\lfloor N/2 \rfloor}^{-1} a_{k(-)} \cdot e^{j2\pi k \Delta f^* t} + \sum_{k=1}^{\lceil N/2 \rceil} a_{k(+)} \cdot e^{j2\pi k \Delta f^* t}, \qquad \text{Formula (16)}$$

where t represents a time independent variable of the baseband signal s(t);

$k^{(-)}=k+\lfloor N/2 \rfloor, k^{(+)}=k+\lfloor N/2 \rfloor-1$;

$\Delta f$ is a subcarrier spacing; $a_k$ is a value obtained after frequency domain data is mapped to a corresponding subcarrier; $N=N_{RB}^{DL}N_{sc}^{RB}$, where $N_{RB}^{DL}$ represents a quantity of RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth.

In another embodiment for obtaining the baseband signal, the obtaining the baseband signal from the frequency domain signal by means of SC-FDMA may include obtaining the baseband signal according to the following formula:

$$s(t) = \sum_{k=-\lfloor N/2 \rfloor}^{\lceil N/2 \rceil-1} a_{k(-)} \cdot e^{j2\pi(k+1/2)\Delta f^* t}, \qquad \text{Formula (17)}$$

where t represents a time independent variable of the baseband signal s(t);

$k^{(-)}=k+\lfloor N/2 \rfloor$;

$\Delta f$ is a subcarrier spacing; $a_k$ is a value obtained after frequency domain data is mapped to a corresponding subcarrier; $N=N_{RB}^{UL}N_{sc}^{RB}$, where $N_{RB}^{UL}$ represents a quantity of RBs configured for system bandwidth, and $N_{sc}^{RB}$ represents a size of the resource block in a frequency domain; $\lfloor \ \rfloor$ represents a round down operation; and N is a quantity of subcarriers configured for the system bandwidth. The method for obtaining the baseband signal is also applicable to signal sending based on an LTE uplink SC-FDMA modulation scheme.

Optionally, before the mapping the synchronization signal to a subcarrier by means of SC-FDMA, to obtain the baseband signal, the synchronization signal sending method may further include: performing discrete Fourier transform (Discrete Fourier Transform, DFT for short) on the synchronization signal, to obtain a converted signal; and the mapping the synchronization signal to a subcarrier by means of SC-FDMA, to obtain the baseband signal is specifically: mapping the converted signal to the subcarrier by means of SC-FDMA, to obtain the baseband signal. Performing DFT processing on the synchronization signal can further reduce a PAPR value of the synchronization signal. In an embodiment in which a DFT processing step is not performed, detection on the synchronization signal may be simplified, and whether to perform DFT processing on the synchronization signal may be determined according to a specific requirement.

Specifically, DFT is performed on the synchronization signal according to the following formula, to obtain the converted signal:

$$b(n) = \frac{1}{\sqrt{L}} \sum_{l=0}^{L-1} d(l) e^{-\frac{2\pi j}{L} l^* n}, \qquad \text{Formula (18)}$$

where l represents an independent variable of the synchronization signal d(l); L is the length of the synchronization signal; b(n) represents the converted signal obtained after DFT is performed on the synchronization signal, where 0≤n≤L−1; and j represents an imaginary unit.

FIG. 12 is a schematic flowchart of Embodiment 5 of a synchronization signal sending method according to the embodiments. As shown in FIG. 12, this embodiment is based on the embodiment shown in FIG. 8, and further, the synchronization signal sending method may include.

S701. Generate a synchronization signal according to one or more sequences.

S702. Obtain a converted signal after performing DFT processing on the synchronization signal.

This step is an optional step. The synchronization signal generated in S701 may be directly mapped to a subcarrier, that is, S703 is performed.

S703. Map the converted signal to a subcarrier, to obtain a frequency domain signal.

S704. Obtain a time domain signal according to the frequency domain signal.

The time domain signal in this step is the baseband signal in the embodiment shown in FIG. 8.

S705. Send the time domain signal after performing radio frequency conversion.

The radio frequency conversion herein is mainly to implement frequency modulation, transmission filtering, and transmit power amplification at a transmit end of the synchronization signal, and a purpose of the radio frequency conversion is to convert the generated time domain signal into a radio signal transmitted on a specific frequency, so that the signal is directly sent out by using a corresponding antenna.

For a processing method and an actual effect of each step in this embodiment, refer to the foregoing embodiment, and details are not further described herein.

FIG. 13 is a schematic flowchart of Embodiment 1 of a synchronization signal receiving method according to the embodiments. This embodiment provides the synchronization signal receiving method, and the method is used for synchronization between a transmit end and a receive end of a synchronization signal, and may be executed by a synchronization signal receiving apparatus. The apparatus may be integrated in a signal receiving device such as UE or a base station. As shown in FIG. 13, the synchronization signal receiving method includes.

S801. Receive a synchronization signal, where the synchronization signal is generated by a transmit end according to one or more sequences, and a length or lengths of the one or more sequences are determined according to a length of the synchronization signal.

S802. Detect the synchronization signal, to obtain synchronization between the transmit end and a receive end of the synchronization signal.

The synchronization between the transmit end and the receive end may include time synchronization, frequency synchronization, and the like.

This embodiment is an embodiment of a receive end corresponding to the foregoing embodiment of a transmit end, and for a specific function and effect, refer to the description in the embodiment of the transmit end.

The receive end of the synchronization signal first receives the synchronization signal such as an SD2DSS provided in the embodiments; then detects the synchronization signal at a location of synchronization signal, to obtain a synchronization parameter such as a time parameter or a frequency parameter; and further receives and demodulates control information and data information according to the synchronization parameter.

In the foregoing embodiment, the sequence may include an m-sequence, a ZC sequence, or a combination thereof.

In an embodiment, if the sequence is an m-sequence with a length of 31, a primitive polynomial for generating the one or more sequences is any one or any combination of the following polynomials:

$x(\tilde{i}+5)=(x(\tilde{i}+2)+x(\tilde{i}))\bmod 2$ $x(\tilde{i}+5)=(x(\tilde{i}+3)+x(\tilde{i}))\bmod 2$ $x(\tilde{i}+5)=(x(\tilde{i}+3)+x(\tilde{i}+2)+x(\tilde{i}+1)+x(\tilde{i}))\bmod 2$ $x(\tilde{i}+5)=(x(\tilde{i}+4)+x(\tilde{i}+2)+x(\tilde{i}+1)+x(\tilde{i}))\bmod 2$ $x(\tilde{i}+5)=(x(\tilde{i}+4)+x(\tilde{i}+3)+x(\tilde{i}+1)+x(\tilde{i}))\bmod 2$ $x(\tilde{i}+5)=(x(\tilde{i}+4)+x(\tilde{i}+3)+x(\tilde{i}+2)+x(\tilde{i}))\bmod 2$, where $\tilde{i}$ is an integer, a value range of $\tilde{i}$ is $0\leq\tilde{i}\leq 25$, and mod 2 represents a modulo operation of division by 2.

In another embodiment, if the sequence is an m-sequence with a length of 63, a primitive polynomial for generating the one or more sequences is any one or any combination of the following polynomials:

$x(\tilde{i}+6)=(x(\tilde{i}+1)+x(\tilde{i}))\bmod 2$ $x(\tilde{i}+6)=(x(\tilde{i}+4)+x(\tilde{i}+3)+x(\tilde{i}+1)+x(\tilde{i}))\bmod 2$ $x(\tilde{i}+6)=(x(\tilde{i}+5)+x(\tilde{i}))\bmod 2$ $x(\tilde{i}+6)=(x(\tilde{i}+5)+x(\tilde{i}+2)+x(\tilde{i}+1)+x(\tilde{i}))\bmod 2$ $x(\tilde{i}+6)=(x(\tilde{i}+5)+x(\tilde{i}+3)+x(\tilde{i}+2)+x(\tilde{i}))\bmod 2$ $x(\tilde{i}+6)=(x(\tilde{i}+5)+x(\tilde{i}+4)+x(\tilde{i}+1)+x(\tilde{i}))\bmod 2$, where $\tilde{i}$ is an integer, a value range of $\tilde{i}$ is $0\leq\tilde{i}\leq 56$, and mod 2 represents a modulo operation of division by 2.

Optionally, the synchronization signal receiving method may further include: detecting, according to a preset criterion, whether the synchronization signal is received; and if the synchronization signal is not detected, sending, as the transmit end, a synchronization signal generated by the receive end to another receive end. In this embodiment, the synchronization signal is detected at the receive end according to a preset criterion, for example, detected at a predefined location whether strength of the synchronization signal is lower than a predefined threshold; and when no synchronization signal is detected, a device that serves as the receive end of the synchronization signal may serve as the transmit end of the synchronization signal, and transmit the synchronization signal to another receive end according to the method provided in the embodiments, so as to implement synchronization between the receive end and the transmit end.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of the embodiments, but not for limiting the embodiments. Although the embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A device comprising:
   a processor; and
   a non-transitory computer readable storage medium storing a program for execution by the processor, the program including instructions to:
   generate a synchronization signal according to one or more sequences comprising one or more first sequences, wherein one or more lengths of the one or more sequences are determined according to a length of the synchronization signal;
   determine, for each of the one or more first sequences, an identifier (ID) of the synchronization signal according to one or more first preset values corresponding to the one or more first sequences;
   obtain a baseband signal according to the synchronization signal; and
   send, the baseband signal after performing radio frequency conversion.

2. The device according to claim 1, wherein the instructions further comprise instructions to:
   determine one or more first lengths of the one or more first sequences according to the length of the synchronization signal;
   determine one or more first preset values corresponding to the one or more first sequences, wherein values of the one or more first preset values corresponding to each first sequence are independent; and
   perform cyclic shifting on the one or more first sequences according to the one or more first preset values, to generate the synchronization signal.

3. The device according to claim 2, wherein the one or more sequences further comprise one or more second sequences, and wherein the instructions further comprise instructions to:
   generate a scrambling sequence according to the one or more second sequences; and
   perform scrambling processing at least one time on the synchronization signal using the scrambling sequence; and
   wherein obtaining the baseband signal according to the synchronization signal comprises:
   obtaining the baseband signal according to the synchronization signal undergoing scrambling processing.

4. The device according to claim 3, wherein the instructions further comprise instructions to:
   determine one or more lengths of the one or more second sequences according to the length of the synchronization signal;
   determine one or more second preset values corresponding to the one or more second sequences, wherein the one or more second sequences correspond to one second preset value or different second preset values, and wherein preset values of scrambling sequences corresponding to synchronization sources in a group are the same; and
   perform cyclic shifting on each second sequence according to the one or more second preset values, to generate the scrambling sequence.

5. The device according to claim 4, wherein either one of the one or more first preset values or one of the one or more second preset values is determined according to a group identity.

6. The device according to claim 5, wherein the group identity is a function of a primary device to device synchronization signal (PD2DSS) identity.

7. The device according to claim 5, wherein the group identity is carried in a first control instruction delivered by a network, on a second control instruction delivered by a transmit device, or is implicitly indicated by the network.

8. The device according to claim 1, wherein determining an ID of the synchronization signal comprises:
   determining the ID of the synchronization signal according to all of the one or more first preset values corresponding to the first sequences;
   determining the ID of the synchronization signal according to a primary device to device synchronization signal (PD2DSS) identity and all of the one or more first preset values corresponding to the first sequences;
   determining the ID of the synchronization signal according to any one of the one or more first preset values corresponding to the first sequences; or
   determining the ID of the synchronization signal according to the PD2DSS identity and any one of the one or more first preset values of the first sequences.

9. A device comprising:
   a processor; and
   a non-transitory computer readable storage medium storing a program for execution by the processor, the program including instructions to:
   receive a synchronization signal, wherein the synchronization signal is generated by a transmit end according to one or more sequences comprising one or more first sequences, wherein one or more lengths of the one or more sequences are determined according to a length of the synchronization signal, and wherein an identifier (ID) of the synchronization signal is determined according to one or more first preset values corresponding to the first sequences; and
   detect the synchronization signal to obtain synchronization between the transmit end and a receive end of the synchronization signal.

10. The device according to claim 9, wherein the sequence is generated according to an m-sequence, a Zadoff-Chu (ZC) sequence, or a combination thereof.

11. The device according to claim 9, wherein if the sequence is an m-sequence with a length of 31, and wherein a primitive polynomial for generating the one or more sequences is at least one of the following polynomials:

$x(\bar{i}+5)=(x(\bar{i}+2)+x(\bar{i}))\bmod 2$ $x(\bar{i}+5)=(x(\bar{i}+3)+x(\bar{i}))\bmod 2$ $x(\bar{i}+5)=(x(\bar{i}+3)+x(\bar{i}+2)+x(\bar{i}+1)+x(\bar{i}))\bmod 2$ $x(\bar{i}+5)=(x(\bar{i}+4)+x(\bar{i}+2)+x(\bar{i}+1)+x(\bar{i}))\bmod 2$ $x(\bar{i}+5)=(x(\bar{i}+4)+x(\bar{i}+3)+x(\bar{i}+1)+x(\bar{i}))\bmod 2$ $x(\bar{i}+5)=(x(\bar{i}+4)+x(\bar{i}+3)+x(\bar{i}+2)+x(\bar{i}))\bmod 2$, wherein $\bar{i}$ is an integer, wherein a value range of $\bar{i}$ is $0\leq\bar{i}\leq 25$, and wherein mod 2 represents a modulo operation of division by 2.

12. The device according to claim 9, wherein a primitive polynomial for generating the one or more sequences is at least one of the following polynomials:

$x(\bar{i}+6)=(x(\bar{i}+1)+x(\bar{i}))\bmod 2$ $x(\bar{i}+6)=(x(\bar{i}+4)+x(\bar{i}+3)+x(\bar{i}+1)+x(\bar{i}))\bmod 2$ $x(\bar{i}+6)=(x(\bar{i}+5)+x(\bar{i}))\bmod 2$ $x(\bar{i}+6)=(x(\bar{i}+5)+x(\bar{i}+2)+x(\bar{i}+1)+x(\bar{i}))\bmod 2$ $x(\bar{i}+6)=(x(\bar{i}+5)+x(\bar{i}+3)+x(\bar{i}+2)+x(\bar{i}))\bmod 2$ $x(\bar{i}+6)=(x(\bar{i}+5)+x(\bar{i}+4)+x(\bar{i}+1)+x(\bar{i}))\bmod 2$, wherein $\bar{i}$ is an integer, wherein a value range of $\bar{i}$ is $0\leq\bar{i}\leq 56$, and wherein mod 2 represents a modulo operation of division by 2, in response to the sequence being an m-sequence with a length of 63.

13. The device according to claim 9, wherein the instructions further comprise instructions to:
detect, according to a preset criterion, whether the device receives the synchronization signal; and
trigger sending a synchronization signal generated by the device to another receive end in response to the synchronization signal not being detected.

14. A method comprising:
generating, by a sender, a synchronization signal, according to one or more sequences comprising one or more first sequences, wherein one or more lengths of the one or more sequences are determined according to a length of the synchronization signal;
determine, for each of the one or more first sequences, an identifier (ID) of the synchronization signal according to one or more first preset values corresponding to the one or more first sequences;
obtaining, by the sender, a baseband signal according to the synchronization signal; and
sending, by the sender, the baseband signal, after performing radio frequency conversion.

15. The method according to claim 14, wherein generating, by the sender, the synchronization signal according to the one or more sequences comprises:
determining, by the sender, one or more lengths of the one or more first sequences according to the length of the synchronization signal;
determining, by the sender, one or more first preset values corresponding to the one or more first sequences, wherein preset values corresponding to each of the one or more first sequences are independent; and
performing, by the sender, cyclic shifting on the one or more first sequences according to the one or more first preset values, to generate the synchronization signal.

16. The method according to claim 15, wherein the one or more sequences further comprise one or more second sequences, and wherein generating, by the sender, a synchronization signal according to the one or more sequences further comprises:

generating, by the sender, a scrambling sequence according to the one or more second sequences; and
performing, by the sender, scrambling processing on the synchronization signal using the scrambling sequence; and
wherein obtaining, by the sender, the baseband signal according to the synchronization signal comprises:
obtaining, by the sender, the baseband signal according to the synchronization signal undergoing the scrambling processing.

17. The method according to claim 16, wherein generating, by the sender, the scrambling sequence according to the one or more second sequences comprises:
determining, by the sender, one or more lengths of the one or more second sequences according to the length of the synchronization signal;
determining, by the sender, one or more second preset values corresponding to the one or more second sequences, wherein sequences of the one or more second sequences correspond to one second preset value of the one or more second preset values or to different second preset values of the one or more second preset values, and wherein second preset values of scrambling sequences corresponding to synchronization sources in a group are the same or are different; and
performing, by the sender, cyclic shifting on each of the one or more second sequences according to the one or more second preset values, to generate the scrambling sequence.

18. The method according to claim 17, wherein either the one or more first preset values or the one or more second preset values are determined according to a group identity.

19. The method according to claim 18, wherein the group identity is a function of a primary device to device synchronization signal (PD2DSS) identity, is carried in a first control instruction delivered by a network, or carried in a second control instruction delivered by a transmit device, or is implicitly indicated by the network.

20. The method according to claim 15, wherein determining an ID of the synchronization signal comprises:
determining, by the sender, the ID of the synchronization signal according to all of the one or more first preset values corresponding to the first sequences;
determining, by the sender, the ID of the synchronization signal according to a primary device to device synchronization signal (PD2DSS) identity and all of the one or more first preset values corresponding to the first sequences;
determining, by the sender, the ID of the synchronization signal according to any one of the one or more first preset values corresponding to the first sequences; or
determining, by the sender, the ID of the synchronization signal according to the PD2DSS identity and any one of the one of the one or more first preset values corresponding to the first sequences.

* * * * *